(12) United States Patent
Connor

(10) Patent No.: US 8,587,498 B2
(45) Date of Patent: Nov. 19, 2013

(54) 3D IMAGE DISPLAY WITH BINOCULAR DISPARITY AND MOTION PARALLAX

(75) Inventor: Robert A. Connor, Minneapolis, MN (US)

(73) Assignee: Holovisions LLC, Forest Lake, MN (US)

( * ) Notice: Subject to any disclaimer, the term of this patent is extended or adjusted under 35 U.S.C. 154(b) by 528 days.

(21) Appl. No.: 12/660,568

(22) Filed: Mar. 1, 2010

(65) Prior Publication Data

US 2011/0211256 A1    Sep. 1, 2011

(51) Int. Cl.
*G09G 5/00* (2006.01)
*G02B 27/22* (2006.01)

(52) U.S. Cl.
USPC ............................................. 345/6; 359/463

(58) Field of Classification Search
USPC ................................................ 345/6; 359/463
See application file for complete search history.

(56) References Cited

U.S. PATENT DOCUMENTS

| | | |
|---|---|---|
| 3,199,116 A | 8/1965 | Ross |
| 3,602,572 A | 8/1971 | Norris |
| 4,160,973 A | 7/1979 | Berlin |
| 4,740,073 A | 4/1988 | Meacham |
| 5,111,313 A | 5/1992 | Shires |
| 5,132,839 A | 7/1992 | Travis |
| 5,148,310 A | 9/1992 | Batchko |
| 5,300,942 A | 4/1994 | Dolgoff |
| 5,311,220 A | 5/1994 | Eichenlaub |
| 5,465,175 A | 11/1995 | Woodgate et al. |
| 5,493,427 A | 2/1996 | Nomura et al. |
| 5,550,676 A | 8/1996 | Ohe et al. |
| 5,581,378 A | 12/1996 | Kulick et al. |
| 5,602,679 A | 2/1997 | Dolgoff et al. |
| 5,689,321 A | 11/1997 | Kochi |
| 5,694,235 A | 12/1997 | Kajiki |
| 5,704,061 A | 12/1997 | Anderson |
| 5,790,086 A | 8/1998 | Zelitt |
| 5,801,761 A | 9/1998 | Tibor |
| 5,825,541 A | 10/1998 | Imai |
| 5,872,590 A | 2/1999 | Aritake et al. |
| 5,900,982 A | 5/1999 | Dolgoff et al. |
| 5,982,342 A | 11/1999 | Iwata et al. |
| 5,986,811 A | 11/1999 | Wohlstadter |
| 6,014,164 A | 1/2000 | Woodgate et al. |
| 6,014,259 A | 1/2000 | Wohlstadter |
| 6,061,083 A | 5/2000 | Aritake et al. |
| 6,061,489 A | 5/2000 | Ezra et al. |
| 6,064,424 A | 5/2000 | van Berkel et al. |
| 6,070,985 A * | 6/2000 | Riser et al. .................... 362/551 |
| 6,115,059 A | 9/2000 | Son et al. |
| 6,128,132 A | 10/2000 | Wieland et al. |
| 6,201,565 B1 | 3/2001 | Balogh |
| 6,259,450 B1 | 7/2001 | Chiabrera et al. |
| 6,329,963 B1 | 12/2001 | Chiabrera et al. |

(Continued)

*Primary Examiner* — Jonathan Boyd

(57) ABSTRACT

This invention is a device for displaying images that appear to be three-dimensional, with binocular disparity and motion parallax, for multiple viewers in different viewing locations. This device includes an array of display elements wherein at least one of these display elements includes: one or more light-emitting members; and two or more rotating concentric light guides whose rotation guides the directions of the light rays from the one or more light-emitting members. This invention has several advantages over methods for displaying three-dimensional images in the prior art. It offers a wide range of motion parallax in different directions for multiple viewers, does not require glasses or head tracking, creates images with full potential for opacity and occlusion, and does not require coherent light.

47 Claims, 9 Drawing Sheets

(56) References Cited

U.S. PATENT DOCUMENTS

| | | |
|---|---|---|
| 6,344,837 B1 | 2/2002 | Gelsey |
| 6,437,919 B1 | 8/2002 | Brown et al. |
| 6,437,920 B1 | 8/2002 | Wohlstadter |
| 6,533,420 B1 | 3/2003 | Eichenlaub |
| 6,547,400 B1 | 4/2003 | Yokoyama |
| 6,606,078 B2 | 8/2003 | Son et al. |
| 6,665,108 B2 | 12/2003 | Brown et al. |
| 6,714,174 B2 | 3/2004 | Suyama et al. |
| 6,736,512 B2 | 5/2004 | Balogh |
| 6,755,534 B2 | 6/2004 | Veligdan et al. |
| 6,791,512 B1 | 9/2004 | Shimada |
| 6,795,241 B1 | 9/2004 | Holzbach |
| 6,798,390 B1 | 9/2004 | Sudo et al. |
| 6,816,158 B1 | 11/2004 | Lemelson et al. |
| 6,819,489 B2 | 11/2004 | Harris |
| 6,831,678 B1 | 12/2004 | Travis |
| 6,843,564 B2 | 1/2005 | Putilin et al. |
| 6,876,495 B2 | 4/2005 | Street |
| 6,909,555 B2 | 6/2005 | Wohlstadter |
| 6,956,687 B2 | 10/2005 | Moon et al. |
| 6,999,071 B2 | 2/2006 | Balogh |
| 7,023,466 B2 | 4/2006 | Favalora et al. |
| 7,030,903 B2 | 4/2006 | Sudo |
| 7,036,935 B2 | 5/2006 | Shpizel |
| 7,046,447 B2 | 5/2006 | Raber |
| 7,084,841 B2 | 8/2006 | Balogh |
| 7,106,519 B2 | 9/2006 | Aizenberg et al. |
| 7,113,158 B1 | 9/2006 | Fujiwara et al. |
| 7,123,287 B2 | 10/2006 | Surman |
| 7,167,313 B2 | 1/2007 | Wohlstadter |
| 7,182,463 B2 | 2/2007 | Conner et al. |
| 7,204,593 B2 | 4/2007 | Kubota et al. |
| 7,250,990 B2 | 7/2007 | Sung et al. |
| 7,261,417 B2 | 8/2007 | Cho et al. |
| 7,265,902 B2 | 9/2007 | Lee et al. |
| 7,268,943 B2 | 9/2007 | Lee |
| 7,277,226 B2 | 10/2007 | Cossairt et al. |
| 7,283,308 B2 | 10/2007 | Cossairt et al. |
| 7,297,474 B2 | 11/2007 | Aizenberg et al. |
| 7,300,157 B2 | 11/2007 | Conner et al. |
| 7,327,389 B2 | 2/2008 | Horimai et al. |
| 7,336,244 B2 | 2/2008 | Suyama et al. |
| 7,342,721 B2 | 3/2008 | Lukyanitsa |
| 7,364,300 B2 | 4/2008 | Favalora et al. |
| 7,375,885 B2 | 5/2008 | Ijzerman et al. |
| 7,382,425 B2 | 6/2008 | Sung et al. |
| 7,400,447 B2 | 7/2008 | Sudo et al. |
| 7,423,796 B2 | 9/2008 | Woodgate et al. |
| 7,425,951 B2 | 9/2008 | Fukushima et al. |
| 7,426,068 B2 | 9/2008 | Woodgate et al. |
| 7,432,892 B2 | 10/2008 | Lee et al. |
| 7,446,733 B1 | 11/2008 | Hirimai |
| 7,450,188 B2 | 11/2008 | Schwerdtner |
| 7,471,352 B2 | 12/2008 | Woodgate et al. |
| 7,480,099 B2 | 1/2009 | Raber |
| 7,490,941 B2 | 2/2009 | Mintz et al. |
| 7,492,513 B2 | 2/2009 | Fridman et al. |
| 7,492,523 B2 | 2/2009 | Dolgoff |
| 7,505,646 B2 | 3/2009 | Katou et al. |
| 7,506,984 B2 | 3/2009 | Saishu et al. |
| 7,513,623 B2 | 4/2009 | Thomas |
| 7,525,541 B2 | 4/2009 | Chun et al. |
| 7,532,225 B2 | 5/2009 | Fukushima et al. |
| 8,033,706 B1 * | 10/2011 | Kelly et al. ............ 362/607 |
| 2002/0084951 A1 | 7/2002 | McCoy |
| 2003/0025995 A1 | 2/2003 | Redert et al. |
| 2003/0058209 A1 | 3/2003 | Balogh |
| 2003/0067421 A1 | 4/2003 | Sullivan |
| 2003/0076423 A1 | 4/2003 | Dolgoff |
| 2003/0206343 A1 | 11/2003 | Morishima et al. |
| 2004/0141237 A1 | 7/2004 | Wohlstadter |
| 2004/0150583 A1 | 8/2004 | Fukushima et al. |
| 2004/0178969 A1 | 9/2004 | Zhang et al. |
| 2004/0212550 A1 | 10/2004 | He |
| 2004/0252187 A1 | 12/2004 | Alden |
| 2005/0041162 A1 | 2/2005 | Lee et al. |
| 2005/0073577 A1 | 4/2005 | Sudo et al. |
| 2005/0093713 A1 * | 5/2005 | Orme ............ 340/815.4 |
| 2005/0111100 A1 | 5/2005 | Mather et al. |
| 2005/0152156 A1 | 7/2005 | Favalora et al. |
| 2005/0180007 A1 | 8/2005 | Cossairt et al. |
| 2005/0219693 A1 | 10/2005 | Hartkop et al. |
| 2005/0231810 A1 | 10/2005 | Wohlstadter |
| 2005/0248972 A1 | 11/2005 | Kondo et al. |
| 2005/0264560 A1 | 12/2005 | Hartkop et al. |
| 2005/0270645 A1 | 12/2005 | Cossairt et al. |
| 2005/0280894 A1 | 12/2005 | Hartkop et al. |
| 2005/0285936 A1 | 12/2005 | Redert et al. |
| 2006/0023065 A1 | 2/2006 | Alden |
| 2006/0109200 A1 | 5/2006 | Alden |
| 2006/0109202 A1 | 5/2006 | Alden |
| 2006/0158729 A1 | 7/2006 | Vissenberg et al. |
| 2006/0176541 A1 | 8/2006 | Woodgate et al. |
| 2006/0203208 A1 | 9/2006 | Thielman et al. |
| 2006/0244918 A1 | 11/2006 | Cossairt et al. |
| 2006/0279680 A1 | 12/2006 | Karman et al. |
| 2007/0035829 A1 | 2/2007 | Woodgate et al. |
| 2007/0058127 A1 | 3/2007 | Mather et al. |
| 2007/0058258 A1 | 3/2007 | Mather et al. |
| 2007/0097019 A1 | 5/2007 | Wynnepowell et al. |
| 2007/0165013 A1 | 7/2007 | Goulanian et al. |
| 2007/0222915 A1 | 9/2007 | Niioka et al. |
| 2007/0242237 A1 | 10/2007 | Thomas |
| 2008/0007511 A1 | 1/2008 | Tsuboi et al. |
| 2008/0043014 A1 * | 2/2008 | Tachi et al. .......... 345/419 |
| 2008/0094323 A1 * | 4/2008 | Sirmon et al. .......... 345/83 |
| 2008/0117233 A1 | 5/2008 | Mather et al. |
| 2008/0117289 A1 | 5/2008 | Schowengerdt et al. |
| 2008/0136981 A1 * | 6/2008 | Kawakami et al. ........ 349/15 |
| 2008/0150936 A1 | 6/2008 | Karman |
| 2008/0204873 A1 | 8/2008 | Daniell |
| 2008/0231690 A1 | 9/2008 | Woodgate et al. |
| 2008/0266387 A1 | 10/2008 | Krijn et al. |
| 2008/0273242 A1 | 11/2008 | Woodgate et al. |
| 2008/0297670 A1 | 12/2008 | Tzschoppe et al. |
| 2008/0309663 A1 | 12/2008 | Fukushima et al. |
| 2009/0002262 A1 | 1/2009 | Fukushima et al. |
| 2009/0021824 A1 | 1/2009 | Ijzerman et al. |
| 2009/0033812 A1 | 2/2009 | Ijzerman et al. |
| 2009/0040294 A1 | 2/2009 | Smalley et al. |
| 2009/0040753 A1 | 2/2009 | Matsumoto et al. |
| 2009/0046037 A1 | 2/2009 | Whitehead et al. |
| 2009/0052027 A1 | 2/2009 | Yamada et al. |
| 2009/0052049 A1 | 2/2009 | Batchko et al. |
| 2009/0052164 A1 | 2/2009 | Kashiwagi et al. |
| 2009/0079728 A1 | 3/2009 | Sugita et al. |
| 2009/0079733 A1 | 3/2009 | Fukushima et al. |
| 2009/0096726 A1 | 4/2009 | Uehara et al. |
| 2009/0096943 A1 | 4/2009 | Uehara et al. |
| 2011/0261158 A1 * | 10/2011 | Suh et al. ............ 348/43 |

\* cited by examiner

3D IMAGE DISPLAY WITH BINOCULAR DISPARITY AND MOTION PARALLAX

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND

1. Field of Invention

This invention relates to devices that display images that appear to be three-dimensional with binocular disparity and motion parallax for multiple viewers.

2. Review of the Prior Art

Introduction to Three-Dimensional Image Displays

Devices that display images that appear to be three-dimensional, especially those featuring binocular disparity and motion parallax, are useful for a wide variety of applications including: medical imaging and procedures; entertainment, movies, and computer gaming; advertising and merchandising; communications and teleconferencing; information display and data manipulation; virtual exercise; virtual tours; molecular and genetic engineering; military and security applications; navigation and telerobotics; and product development, mechanical design, and industrial production.

Humans use several visual cues to recognize and interpret three-dimensionality in images. Monocular cues can be seen with just one eye. Monocular cues for three-dimensional images include: lighting and shading; linear perspective; the relative sizes of familiar objects of known size; objects in the foreground overlapping objects in the background (called "occlusion"); adjusting eye muscles to focus on an object at one distance while objects at other distances are out of focus (called "accommodation"); and objects moving relative to each other when one's head moves (called "motion parallax"). Binocular cues require two eyes. Binocular cues for three-dimensional images include: seeing an object or scene from slightly different perspectives in one's right and left eyes (called "binocular disparity" or "stereopsis"); and the intersection of the viewing axes from one's right and left eyes (called "convergence"). When a method of displaying three-dimensional images provides some of these visual cues, but not others, then the conflicting signals can cause eye strain and headaches for the viewer.

The ultimate goal for methods of displaying three-dimensional images is to provide as many of these visual cues for three-dimensionality as possible while also: providing good image resolution and color; enabling large-scale displays; being viewable simultaneously by multiple viewers in different positions; not requiring special headgear; and being safe. This goal has not yet been achieved by current methods for displaying three-dimensional images. We now discuss twelve categories of methods for three-dimensional display, their limitations, and some examples of prior art that appear to use these methods. Since prior art sometimes uses multiple methods, it is not always possible to neatly categorize examples of prior art into just one category, but the exercise and the categorization framework are nonetheless useful for structuring a review of the prior art. After this review, we introduce the novel invention that is claimed in this application and discuss how it addresses many of the limitations of the prior art.

Three-Dimensional Image Displays Using Glasses or Other Headgear

A long-standing method for displaying three-dimensional images involves glasses, or other headgear, that display slightly different views of an object or scene to a viewer's right and left eyes. This difference is called "binocular disparity". When the images that are seen in the right and left eyes are different perspectives of the same object or scene, as one would see when viewing the object or scene in the real world, then the brain interprets these two images synergistically as a single three-dimensional image. This is called "stereoscopic vision" or "stereopsis".

There are three general ways in which glasses, or other headgear, can present different images to the two eyes using current technology. The first way involves lenses with different filters for the right and left eyes. For example, different color lenses (such as red vs. cyan) can each filter a different color in order to present different right and left views of an object to the right and left eyes. As another example, lenses with different polarizations (such as two perpendicularly-differing linear polarizations or two counter-rotational circular polarizations) can filter different image orientations in order to present different right and left views of an object to the right and left eyes. A second way involves glasses, or other headgear, with sequentially-alternating shutters on the right and left eyes. These sequentially-alternating shutters allow different right and left views to reach the right and left eyes in a time-sequential manner. A third way involves headgear with two independent image projectors, one for each eye, that independently display different right and left views to the right and left eyes.

Limitations of three-dimensional display using glasses or other headgear include: (1) inconvenience of glasses, or other headgear, for people who do not normally wear glasses and potential incompatibility with regular glasses for people who do normally wear glasses; (2) no motion parallax (at least without viewer head tracking, which addresses some limitations but creates others) and, as a result, multiple viewers see the same image from the same perspective regardless of their location or movement; and (3) conflict between accommodation and stereoscopic vision that can cause eye strain, headaches, and long-term adverse effects.

Three-Dimensional Image Displays Using Stationary Optics

Due to the problems with three-dimensional display using glasses, or other headgear, identified above, there have been efforts to develop methods of three-dimensional display that do not require glasses or other headgear. Devices for displaying three-dimensional images with binocular disparity that do not require glasses or other headgear are called "autostereoscopic." One general category of autostereoscopic devices involves devices with stationary optical components that do not move in real time during imaging. (Such devices may have components that shift, or otherwise move, when they are switched between a two-dimensional display mode and a three-dimensional display mode, but if movement does not occur in real time during imaging then we classify them as having stationary optics.) Types of devices in this general category include: stationary volumetric displays; displays using stationary parallax barriers or lenticular arrays; stationary multi-angle sub-pixel display elements; stationary "fly's eye" lens or pin-hole arrays; and stationary rewritable holographic media. We now discuss each of these types of devices in greater detail.

Volumetric displays have one or more imaging surfaces that actually span a three-dimensional space. In this respect, volumetric displays create images that do not just appear to be three-dimensional, the images actually are three-dimensional. We define a stationary volumetric display as a volumetric display with image projection or light-emitting surfaces that do not move. One long-standing type of stationary volumetric display is a stationary curved projection surface, such as a cylindrical or hemispherical projection surface. Many planetariums use a dome-shaped projection surface for volumetric display. The audience sits under the dome while light beams representing stars and planets are projected onto the dome, creating the effect of a three-dimensional sky. Another type of stationary volumetric display consists of multiple layers (sometimes called "stacks") of light-reflecting projection surfaces with controllable opacity or with light-emitting arrays on transparent surfaces. These displays can be made from Polymer Dispersed Liquid Crystals (PDLCs), Liquid Crystal gel (LC-gel) elements, or arrays of Light Emitting Diodes (LEDs). For devices with light-reflecting projection surfaces, images are generally projected onto different layers in rapid succession, in synchronization with changes in the opacity of different layers. When these changes are sufficiently rapid, images on all layers appear simultaneously to the viewer due to persistence of vision.

Some volumetric displays have a lens or an array of microlenses whose focal lengths can be changed in real time during image projection. The ability to change the lens focal length allows one to project images onto different distance surfaces for creating three-dimensional images. Different methods for changing the focal length of a microlens include: applying an electric potential to a polymeric or elastomeric lens; mechanically deforming a liquid lens sandwiched within a flexible casing; and changing the temperature of the lens. It is a judgment call whether to include devices with variable focal-length lenses (but projection surfaces that do not move) among stationary volumetric displays or whether to include them among moving volumetric displays that we will discuss later. For this review, we have chosen to focus on movement of the projection surface as the primary way to differentiate volumetric displays. Accordingly, we include volumetric displays with variable focal-length lenses and stationary projection surfaces within the general category of stationary volumetric displays.

The limitations of stationary volumetric displays include: (1) images tend to be ghost-like, with no opacity and no occlusion of foreground objects over background objects; (2) image resolution tends to be low and color variation is limited; (3) large amounts of data processing are often required; (4) for displays with stacks of display panels or three-dimensional arrays of light-emitting elements (such as LEDs), there is a dramatic increase in complexity, bulk, weight, and cost with increased display size; (5) for displays with stacks of display panels, there can be undesirable interference patterns as light passes through several panels; (6) for displays in a self-contained volume that is physically isolated from a viewer's hands, there is limited capability for touch-based interaction; and (7) for displays with arrays of light-emitting elements, dark boundaries between the light-emitting elements can create lines, graininess, and rough edges.

Three-dimensional image displays that use stationary parallax barriers or lenticular arrays have parallax barriers (light barriers) or lenticules (lenses) that do not move in real time during imaging. Some such devices may have layers or other components that move when shifting between two-dimensional and three-dimensional display modes, but this is not real time movement during imaging. Parallax barriers are structures that selectively block and transmit light from different portions of a light-emitting, or light-reflecting, surface in order to present the right and left eyes with different perspectives to create binocular disparity and stereopsis. For example, the display surface can show a composite image with vertical image stripes for right and left eye images and the parallax barrier can have vertical slits that direct the appropriate image stripes to reach the right and left eyes when the viewer is located within a restricted viewing location. Generally, if the viewer moves outside the restricted viewing location, then the viewer sees undesirable "pseudoscopic" images with reversed depth, double images, or black lines. These pseudoscopic images can cause eye strain and headaches.

Having some distance between the parallax barrier and a light-emitting, or light-reflecting, surface is required in order for the parallax barrier to direct light rays along different angles to the right and left eyes. However, this distance causes many of the limitations of the parallax barrier method. For example, this distance restricts the proper viewing location within which the viewer must be located in order to avoid pseudoscopic images. This distance is also why parallax barriers do not work well, if at all, for simultaneous viewing by multiple viewers and why motion parallax is limited with parallax barriers.

Lenticules are lenses, generally configured in a lens-repeating array, that selectively steer different portions of an image from a light-emitting, or light-reflecting, surface to the right and left eyes in order to create binocular disparity, stereopsis, and motion parallax. Lenticular arrays may be configured in a single layer or in multiple parallel layers. The most common lenticule configurations are arrays of vertical plano-convex columns, bi-convex columns, or semi-cylindrical columns. Vertical lenticular columns create some motion parallax when a viewer moves their head from side to side, but not when they move their head up and down. Lenticular lens columns may also be arranged horizontally, allowing motion parallax when a viewer moves their head up and down, but not when they move their head from side to side.

Motion parallax from lenticular arrays is generally limited to a modest number of sequential views. Three-dimensional image displays using lenticular arrays display only a limited number of different images as a viewer's head moves. The changing images may appear to come from the same location, but they actually come from different locations associated with each lenticule. This is called spatial demultiplexing. When spatial demultiplexing is accomplished using lenticules, then the number of alternative views (the range of motion parallax) is limited by the space constraints of the lenticule. If the lenticule is large, then the image has low resolution. If the lenticular is small, then the number of different views is quite limited. With current technology, it is rare to have a lenticule-based display that offers more than ten alternative perspectives as a viewer moves their head. This range can be expanded somewhat with additional technology such as head tracking, which we will discuss later in a section on devices with moving optics, but for stationary lenticular arrays the number of different views for motion parallax is generally quite limited.

Due to the spatial constraints of displaying multiple views from different places (eg. strips) so that they are seen coming from the same location (eg. same strip), there is a loss of image resolution in three-dimensional display devices that use lenticular arrays. For this reason, some devices are designed to be switched from a two-dimensional display mode with higher resolution to a three-dimensional display mode with lower resolution. This can be done by shifting one or more lenticular arrays relative to each other or relative to an image display surface. In a first configuration, the two layers perform demultiplexing for three-dimensional display. In a second configuration, the two layers do not perform demultiplexing for two-dimensional display. When this shifting does not occur in real time during imaging, then we classify such mode-shifting devices as having stationary optics.

The limitations of three-dimensional displays that use stationary parallax barriers or lenticular arrays include: (1) the viewing zone is restricted and outside this restricted zone a viewer sees pseudoscopic images (with depth reversal, double images, and black bands); (2) there is a tradeoff between low resolution and limited range of motion parallax (generally less than twelve different perspectives) due to the constraints of spatial demultiplexing; (3) for displays with vertical lenticules or vertical parallax barriers, there is little or no vertical motion parallax (with up and down head motion); (4) such devices are generally restricted to one viewer; (5) lenticular arrays and active parallax barriers, such as Liquid Crystal Display (LCD) shutters, can be expensive and fragile; (6) for displays with parallax barriers, the image can be dim because the barriers block a significant amount of the image light; (7) conflict between accommodation and stereoscopic vision can cause eye strain, headaches, and long-term adverse effects; and (8) boundaries between light-emitting elements can create dark lines, graininess, and rough edges.

Examples in the prior art that appear to use stationary parallax barriers or lenticular arrays include the following U.S. Pat. No. 5,550,676 (Ohe et al., 1996), U.S. Pat. No. 5,790,086 (Zelitt, 1998), U.S. Pat. No. 5,982,342 (Iwata et al., 1999), U.S. Pat. No. 6,064,424 (van Berkel et al., 2000), U.S. Pat. No. 6,201,565 (Balogh, 2001), U.S. Pat. No. 6,547,400 (Yokoyama, 2003), U.S. Pat. No. 6,606,078 (Son et al., 2003), U.S. Pat. No. 6,795,241 (Holzbach, 2004), U.S. Pat. No. 6,843,564 (Putilin et al., 2005), U.S. Pat. No. 6,876,495 (Street, 2005), U.S. Pat. No. 7,084,841 (Balogh, 2006), U.S. Pat. No. 7,250,990 (Sung et al., 2007), U.S. Pat. No. 7,265,902 (Lee et al., 2007), U.S. Pat. No. 7,268,943 (Lee, 2007), U.S. Pat. No. 7,342,721 (Lukyanitsa, 2008), U.S. Pat. No. 7,382,425 (Sung et al., 2008), U.S. Pat. No. 7,400,447 (Sudo et al., 2008), U.S. Pat. No. 7,423,796 (Woodgate et al., 2008), U.S. Pat. No. 7,425,951 (Fukushima et al., 2008), U.S. Pat. No. 7,426,068 (Woodgate et al., 2008), U.S. Pat. No. 7,471,352 (Woodgate et al., 2008), U.S. Pat. No. 7,492,513 (Fridman et al., 2009), and U.S. Pat. No. 7,506,984 (Saishu et al., 2009).

Examples in the prior art that appear to use stationary parallax barriers or lenticular arrays also include the following U.S. patent applications—Nos. 20030206343 (Morishima et al., 2003), 20040150583 (Fukushima et al., 2004), 20050041162 (Lee et al., 2005), 20050073577 (Sudo et al., 2005), 20060176541 (Woodgate et al., 2006), 20060279680 (Karman et al., 2006), 20070035829 (Woodgate et al., 2007), 20070058127 (Mather et al., 2007), 20070097019 (Wynne et al., 2007), 20070222915 (Niioka et al., 2007), 20080150936 (Karman, 2008), 20080204873 (Daniell, 2008), 20080231690 (Woodgate et al., 2008), 20080273242 (Woodgate et al., 2008), 20080297670 (Tzschoppe et al., 2008), 20080309663 (Fukushima et al., 2008), 20090002262 (Fukushima et al., 2009), 20090046037 (Whitehead et al., 2009), 20090079728 (Sugita et al., 2009), 20090079733 (Fukushima et al., 2009), 20090096726 (Uehara et al., 2009), and 20090096943 (Uehara et al., 2009).

Another method of displaying images that appear to be three-dimensional involves stationary multi-angle sub-pixel display elements. Stationary multi-angle sub-pixel display elements are relatively complex. They have "pixels within pixels," sometimes called "sub-pixels," wherein each sub-pixel has a light-channeling structure that directs light rays from the sub-pixel toward the viewer at a different exit angle. This allows one to display different light content (eg. different color and intensity) from different angles from the same spot (eg. the same pixel) on a display surface. With an array of multi-angle sub-pixel display elements, one can create different views of the same object as seen from different locations, thereby creating images that appear to be three-dimensional with binocular disparity and motion parallax.

A stationary multi-angle sub-pixel display element has a number of discrete fixed-location light channels at the sub-pixel level, each of which channels light in a different direction. For example, a stationary multi-angle sub-pixel display element may be a dome-shaped structure that contains an array of fiber optics that each radiate out toward the perimeter of the dome at different angles. In another example, a stationery multi-angle sub-pixel display element may be a stationary concave structure with a central Light Emitting Diode (LED) and multiple lenses that direct light from the LED into different exit angles. In another example, a display element of this type may have a single micro lens and multiple LEDs, wherein light rays from the multiple LEDs pass through the same lens in different trajectories and exit the lens at different angles.

In concept, using stationary multi-angle sub-pixel display elements can be a very powerful method for producing images that appear to be three-dimensional. However, at least with present-day technology, these structures have significant limitations that constrain image resolution and motion parallax. For example, due to the discrete and stationary nature of the sub-pixel elements, and the space constraints involved in structures as small as one pixel, there are limitations on how many different sub-pixel elements one can pack into one display element. This limits the number of discrete exit angles that one can achieve with such structures. For example, how many individual LEDs, optical fibers, microlenses, or other light-channeling sub-pixels at different angles can one fit into a space the size on one pixel? At least with present-day technology, the answer is unlikely to be sufficiently large to provide a high-resolution image with a significant range of motion parallax.

The limitations of multi-angle sub-pixel display elements include: (1) low image resolution, limited number of perspectives, and limited viewing range due to spatial constraints on how many discrete, stationary sub-pixel elements one can fit into a small space the size of one pixel; (2) due to the complexity of the microstructures required to direct light rays along different angles at the pixel-specific level and due to the large numbers of microstructures required in a display array, there is a dramatic increase in display complexity, bulk, and cost with increased display size; (3) conflict between accommodation and stereoscopic vision can cause eye strain, headaches, and long-term adverse effects; and (4) boundaries between light-emitting elements can create dark lines, graininess, and rough edges.

Examples in the prior art that appear to use multi-angle sub-pixel display elements include U.S. Pat. No. 5,132,839 (Travis, 1992), U.S. Pat. No. 5,689,321 (Kochi, 1997), U.S. Pat. No. 6,128,132 (Wieland et al., 2000), U.S. Pat. No. 6,344,837 (Gelsey, 2002), U.S. Pat. No. 6,736,512 (Balogh, 2004), and U.S. Pat. No. 7,446,733 (Hirimai, 2008), and U.S. Patent Application No. 20050285936 (Redert et al; 2005).

Another method of displaying images that appear to be three-dimensional involves the use of "fly's eye" lens or pinhole arrays. "Fly's eye" lens arrays have an array of semi-spherical lenses. When fly's eye lenses are used to take pictures, the process is called "integral photography." In some respects, fly's eye lenses are semi-spherical versions of the linear columnar lenses that are used in common lenticular arrays. Pin-hole arrays have an array of point openings through which an image is viewed. In some respects, pin-hole arrays are semi-spherical versions of the linear slits that are used in common parallax barriers. Fly's eye lens and pin-hole arrays can provide some motion parallax in both vertical and horizontal directions, but have limitations in terms of low image resolution and limited image brightness.

The limitations of fly's eye lens and pin-hole arrays include: (1) images created using pinhole arrays tend to be dim and have low resolution; (2) pinhole and fly's eye lens arrays do not capture and display information from the entire surface of an object; (3) fly's eye lenses tend to be expensive to make; (4) conflict between accommodation and stereoscopic vision can cause eye strain, headaches, and long-term adverse effects; and (5) boundaries between light-emitting elements can create dark lines, graininess, and rough edges.

Another method of displaying images that appear to be three-dimensional involves rewritable holographic media. Holography involves recording and reconstructing the amplitude and phase distributions of an interference pattern of intersecting light beams. The light interference pattern is generally created by the intersection of two beams of coherent light: a signal beam that is reflected off (or passed through) an object and a reference beam that comes from the same source. When the interference pattern is recreated and viewed by an observer, it appears as a three-dimensional object that can be seen from multiple perspectives.

The ability to create non-rewritable holograms has existed for several decades. Non-rewritable holograms create: a limited range of motion parallax for seeing different perspectives of a static object as a viewer moves their head; or a limited series of changing images from the same surface that are seen as a viewer moves their head. Until recently, progress toward holographic animation with motion parallax for animated content (that changes independently of viewer motion) with rewritable holographic media has been limited. However, recently there has been a breakthrough in the use of rewritable holographic media that was achieved by researchers at the University of Arizona (Savas, Tay et al., "An Updatable Holographic Three-Dimensional Display," Nature, 451, Feb. 7, 2008). This breakthrough involves photosensitive media in which holograms can be encoded, erased, and then re-encoded with sufficient speed such that holographic animation (also called "holographic video") is observed. Although this line of research has considerable potential, it is still in an early stage and quite limited with respect to image size, resolution, color, and speed.

The limitations of stationary rewritable holographic media include: (1) image size and resolution are very limited, at least with current technology; (2) the refresh rate (frame speed) is very limited, at least with current technology; (3) there is limited color variation; (4) images tend to be ghost-like; (5) speckle interference patterns and undesirable quantum interactions can occur; (6) this technique can require nearly-darkroom conditions to take pictures for imaging; and (7) there can be cost and safety issues associated with coherent (eg. laser) light.

Three-Dimensional Image Displays Using Image-Wide Linearly-Shifting Optics

Another category of devices for displaying three-dimensional images involves displays that have optical components that shift linearly (such as side-to-side or in-and-out) on an image-wide level. In this review, displays with image-wide linearly-shifting optics are distinguished from: displays with optical components that shift independently at the level of individual pixels; and displays with optical components, at any level, that rotate or move in some other non-linear manner.

One type of display with image-wide linearly-shifting optics is a parallel-shifting volumetric display, wherein one or more projection surfaces shift in parallel through a display volume. Due to persistence of vision, this movement creates a sequence of parallel two-dimensional images in space that, together, comprise a three-dimensional image. Limitations of parallel-shifting volumetric displays include: (1) images tend to be ghost-like, with no opacity or occlusion of foreground objects over background objects; (2) resolution tends to be low and color variation is limited; (3) large amounts of data processing are often required; (4) for displays with moving display surfaces, there is complexity, inertial stress, and mechanical wear and tear associated with larger displays; (5) for displays in a self-contained volume that is physically isolated from a viewer's hands, there is no capability for touch-based interaction; (6) for displays with arrays of active (variable-length) microlenses, larger size displays can be complex and expensive; (7) for displays with arrays of active (variable-length) microlenses, there are constraints on how rapidly the microlenses adjust, especially those with fluid components; and (8) for displays with arrays of light-emitting elements, dark boundaries between the light elements can create lines, graininess, and rough edges.

Another type of display with image-wide linearly-shifting optics is a spatially-demultiplexing device with one or more shifting layers of light-emitting, light-reflecting, light-blocking, or light-refracting layers that include one or more parallax barriers or lenticular arrays. One or more of these layers shift relative to each other, in a linear side-to-side or in-and-out manner, often in parallel planes, at an image-wide level. In display systems with head-tracking mechanisms, the shifting motion of the optical layers can be coordinated with movement of a viewer's head to extend the viewing range in which proper autostereoscopic images are seen and to reduce the chances of pseudoscopic images. In display systems wherein one layer has a scanning hole or lens, the shifting motion of the optical layers can extend the number of views in spatial demultiplexing.

Limitations of displays with image-wide linearly-shifting parallax or lenticular layers include: (1) for displays with head tracking in which optical layers shift in response to viewer head movement, the viewing zone can be expanded but it is still limited, head tracking can be cumbersome, and head tracking does not work well with multiple viewers; (2) there is a still a tradeoff between low horizontal resolution and limited range of motion parallax due to the constraints of spatial demultiplexing; (3) for displays with vertical lenticules or vertical parallax barriers, there is little or no vertical motion parallax (with up and down head motion); (4) mechanical wear and tear associated with real-time moving optical layers, especially for larger displays; (5) lenticular arrays and active parallax barriers, such as Liquid Crystal Display (LCD) shutters, can be expensive and fragile; (6) for displays with parallax barriers, the image can be dim because the barriers block a significant portion of the image light; (7) conflict between accommodation and stereoscopic vision can cause eye strain, headaches, and long-term adverse effects; and (8) boundaries between light elements can create dark lines, graininess, and rough edges.

Examples in the prior art that appear to have image-wide linearly-shifting parallax or lenticular layers include U.S. Pat. No. 4,740,073 (Meacham, 1988), U.S. Pat. No. 5,300,942 (Dolgoff, 1994), U.S. Pat. No. 5,311,220 (Eichenlaub, 1994), U.S. Pat. No. 5,602,679 (Dolgoff et al., 1997), U.S. Pat. No. 5,825,541 (Imai, 1998), U.S. Pat. No. 5,872,590 (Aritake et al., 1999), U.S. Pat. No. 5,900,982 (Dolgoff et al., 1999), U.S. Pat. No. 6,014,164 (Woodgate et al., 2000), U.S. Pat. No. 6,061,083 (Aritake et al., 2000), U.S. Pat. No. 6,791,512 (Shimada, 2004), U.S. Pat. No. 6,798,390 (Sudo et al., 2004), U.S. Pat. No. 7,030,903 (Sudo, 2006), U.S. Pat. No. 7,123,287 (Surman, 2006), U.S. Pat. No. 7,283,308 (Cossairt et al., 2007), U.S. Pat. No. 7,375,885 (Ijzerman et al., 2008), U.S. Pat. No. 7,432,892 (Lee et al., 2008), U.S. Pat. No. 7,450,188 (Schwerdtner, 2008), and U.S. Pat. No. 7,532,225 (Fukushima et al., 2009), and U.S. Patent Application Nos. 20030025995 (Redert et al., 2003), 20030058209 (Balogh, 2003), 20030076423 (Dolgoff, 2003), 20040178969 (Zhang et al., 2004), 20050219693 (Hartkop et al., 2005), 20050264560 (Hartkop et al., 2005), 20050280894 (Hartkop et al., 2005), 20060109202 (Alden, 2006), 20080117233 (Mather et al., 2008), 20080204873 (Daniell, 2008), 20090040753 (Matsumoto et al., 2009), and 20090052027 (Yamada et al., 2009).

Three-Dimensional Image Displays Using Image-Wide Rotating (or Other Non-Linearly-Moving) Optics Another category of devices for displaying three-dimensional images involves displays with optical components that rotate (or move in some other non-linear manner) on an image-wide level.

Rotating volumetric displays generally create three-dimensional images by projecting a series of two-dimensional images onto a rotating surface. When the surface rotates sufficiently rapidly, then this series of two dimensional images is perceived as being simultaneous by a viewer due to persistence of vision. When this series of two-dimensional images comprise views of the same object from different perspectives and these different views are coordinated with the angular movement of the rotating surface, then this creates the perception of a three-dimensional object that can be viewed from different perspectives as one or more viewers move around the display (an effect that is called "angular motion parallax" or "theta parallax").

The rotating surface in such devices may diffuse, reflect, or refract light from the image projected onto it. The shape of the rotating surface may be a disk, square, helix, wedge, pyramid, or some other shape. The rotating surface is generally enclosed to protect the viewer from being harmed by contact with the rapidly rotating surface. It can be challenge to keep the image in focus as the surface rotates. Methods to keep the image in focus as the surface rotates include: a moving projector or reflector that moves in synchronization with the rotating surface; multiple projectors that project images in sequence around the rotating surface; and lenses with variable focal lengths that can be changed in real time. Another type of rotating volumetric display involves light-emitting elements on the rotating surface itself, but connections to light-emitting members on the rotating surface are complex and those light-emitting elements are subject to considerable stress from inertial forces at high rotation rates.

The limitations of rotating volumetric displays include: (1) images tend to be ghost-like, with no opacity or occlusion of foreground objects over background objects; (2) it is difficult to have larger displays due to the mass, inertia, and structural stress of large rapidly-spinning objects; (3) there are issues with the complexity, mechanical wear, and noise of rotary bearings and other moving parts; (4) for displays in which the angle between a screen and projection beam sometimes becomes small during portions of the rotation, the image quality is decreased during such times; and (5) for displays housed in a self-contained volume that is physically isolated from a viewer's hands, there is limited capability for touch-based interaction.

Examples in the prior art that appear to have rotating volumetric displays include U.S. Pat. No. 4,160,973 (Berlin, 1979), U.S. Pat. No. 5,148,310 (Batchko, 1992), U.S. Pat. No. 6,816,158 (Lemelson et al., 2004), U.S. Pat. No. 7,023,466 (Favalora et al., 2006), U.S. Pat. No. 7,277,226 (Cossairt et al., 2007), U.S. Pat. No. 7,364,300 (Favalora et al., 2008), U.S. Pat. No. 7,490,941 (Mintz et al., 2009), and U.S. Pat. No. 7,525,541 (Chun et al., 2009), and U.S. Patent Application Nos. 20050152156 (Favalora et al., 2005), 20050180007 (Cossairt et al., 2005), and 20070242237 (Thomas, 2007).

Another type of three-dimensional display using image-wide rotating (or other non-linearly-moving) optical components is a display with a image-wide rotating (or otherwise non-linearly-moving) lens, light barrier, or mirror. For example, a spinning optical lens with angularly-varying thickness or ridges can be placed in front of an imaging surface. This spinning lens can change the focal distance of elements of the projected image in a rapid, cyclical manner to create three-dimensional effects. As another example, an image may be projected through radial slits in a spinning disk. In another example, a beam of (coherent) light may be reflected off a spinning polygonal mirror onto a diffuser. When changes in the focal distances and/or exit angles of light rays passing through, or reflecting off, an image-wide rotating (or otherwise non-linearly-moving) lens, light barrier, or mirror are coordinated with changes in contents of those light rays, then some three-dimensional effects can be achieved. However, at least with present-day technology, these three-dimensional effects are limited because image-wide rotating members do not provide independent control of exit angles at the level of individual pixels.

The limitations of three-dimensional displays with image-wide rotating (or other non-linearly-moving) optical components include: (1) it can be difficult to achieve motion parallax and binocular disparity with a single image-wide rotating optical member, especially using non-coherent light; (2) the display size can be limited by the inertial forces and stresses of large spinning objects; (3) there are cost, complexity, wear, and noise issues associated with moving components; (4) conflict between accommodation and stereoscopic vision can cause eye strain, headaches, and long-term adverse effects; and (5) rotating mirrors tend to work mainly with coherent light, which can have associated cost and safety issues.

Examples in the prior art that appear to have three-dimensional displays with image-wide rotating (or other non-linearly-moving) optical components include U.S. Pat. No. 3,199,116 (Ross, 1965), U.S. Pat. No. 3,602,572 (Norris, 1971), U.S. Pat. No. 5,111,313 (Shires, 1992), U.S. Pat. No. 5,694,235 (Kajiki, 1997), U.S. Pat. No. 5,704,061 (Anderson, 1997), U.S. Pat. No. 6,061,489 (Ezra et al., 2000), U.S. Pat. No. 6,115,059 (Son et al., 2000), U.S. Pat. No. 6,533,420 (Eichenlaub, 2003), U.S. Pat. No. 6,819,489 (Harris, 2004), U.S. Pat. No. 6,999,071 (Balogh, 2006), U.S. Pat. No. 7,036,935 (Shpizel, 2006), U.S. Pat. No. 7,113,158 (Fujiwara et al., 2006), U.S. Pat. No. 7,182,463 (Conner et al., 2007), U.S. Pat. No. 7,300,157 (Conner et al., 2007), U.S. Pat. No. 7,492,523 (Dolgoff, 2009), and U.S. Pat. No. 7,513,623 (Thomas, 2009), and U.S. Patent Application Nos. 20020084951 (McCoy, 2002), 20030067421 (Sullivan, 2003), 20050248972 (Kondo et al., 2005), 20050270645 (Cossairt et al., 2005), 20060023065 (Alden, 2006), 20060109200 (Alden, 2006), 20060203208 (Thielman et al., 2006), and 20060244918 (Cossairt et al., 2006).

Three-Dimensional Image Displays Using Pixel-Specific, Linearly-Shifting or Tilting Optics Another category of devices for displaying three-dimensional images involves displays with optical components that shift linearly (e.g. side-to-side or in-and-out) or tilt (e.g. to one side or the other) at the level of individual pixels in real time during imaging.

One example of such optical components is a variable focal-length microlens. Variable focal-length microlenses are microscale lenses whose focal lengths can be changed in real time during imaging. Such microlenses are often called "active" or "dynamic." Different methods for changing the focal length of a microlens include: applying an electric potential to a polymeric or elastomeric lens; mechanically deforming a liquid lens sandwiched within a flexible casing; and changing the temperature of the lens. We have already discussed variable-focal-length lenses in the context of volumetric displays where they are used to focus images on different two-dimensional layers or on a rotating projection surface. This present category of devices includes displays that use variable focal-length microlenses, but are not volumetric. An array of variable focal-length microlenses may be used in combination with multiple parallel lenticule layers. Changing the focal length of a microlens can focus light rays from a pixel on a different lenticular layer, changing the exit angle of light rays from a given pixel and creating images that appear to be three-dimensional.

The limitations of non-volumetric three-dimensional displays using pixel-specific variable focal-length microlenses include: (1) for displays with arrays of active (variable-length) microlenses, larger size displays can be complex and expensive; (2) for displays with arrays of active (variable-length) microlenses, there are constraints on how rapidly the microlenses adjust in real time, especially those with fluid components; and (3) conflict between accommodation and stereoscopic vision can cause eye strain, headaches, and long-term adverse effects.

Examples in the prior art that appear to have non-volumetric three-dimensional displays using pixel-specific variable-focal-length microlenses include U.S. Pat. No. 5,465,175 (Woodgate et al., 1995), U.S. Pat. No. 5,493,427 (Nomura et al., 1996), U.S. Pat. No. 5,581,378 (Kulick et al., 1996), U.S. Pat. No. 5,790,086 (Zelitt, 1998), U.S. Pat. No. 5,801,761 (Tibor, 1998), U.S. Pat. No. 5,986,811 (Wohlstadter, 1999), U.S. Pat. No. 6,014,259 (Wohlstadter, 2000), U.S. Pat. No. 6,437,919 (Brown et al., 2002), U.S. Pat. No. 6,437,920 (Wohlstadter, 2002), U.S. Pat. No. 6,665,108 (Brown et al., 2003), U.S. Pat. No. 6,714,174 (Suyama et al., 2004), U.S. Pat. No. 6,755,534 (Veligdan et al., 2004), U.S. Pat. No. 6,831,678 (Travis, 2004), U.S. Pat. No. 6,909,555 (Wohlstadter, 2005), U.S. Pat. No. 7,046,447 (Raber, 2006), U.S. Pat. No. 7,106,519 (Aizenberg et al., 2006), U.S. Pat. No. 7,167,313 (Wohlstadter, 2007), U.S. Pat. No. 7,204,593 (Kubota et al., 2007), U.S. Pat. No. 7,297,474 (Aizenberg et al., 2007), U.S. Pat. No. 7,327,389 (Horimai et al., 2008), U.S. Pat. No. 7,336,244 (Suyama et al., 2008), and U.S. Pat. No. 7,480,099 (Raber, 2009).

Examples in the prior art that appear to have non-volumetric three-dimensional displays using pixel-specific variable-focal-length microlenses also include patent applications such as—U.S. Patent Application Nos. 20040141237 (Wohlstadter, 2004), 20040212550 (He, 2004), 20050111100 (Mather et al., 2005), 20050231810 (Wohlstadter, 2005), 20060158729 (Vissenberg et al., 2006), 20070058258 (Mather et al., 2007), 20070165013 (Goulanian et al., 2007), 20070242237 (Thomas, 2007), 20080007511 (Tsuboi et al., 2008), 20080117289 (Schowengerdt et al., 2008), 20080266387 (Krijn et al., 2008), 20090021824 (Ijzerman et al., 2009), 20090033812 (Ijzerman et al., 2009), 20090052049 (Batchko et al., 2009), and 20090052164 (Kashiwagi et al., 2009).

Another example of three-dimensional displays that use pixel-specific, linearly-shifting or tilting optics are micromirror arrays with adjustable-angle mirrors at the level of individual pixels. Micromirror arrays are generally created and controlled using MEMS (Micro Electro Mechanical Systems). The angle of each mirror is adjusted in real time, during imaging, to change the exit angle for light rays exiting each pixel over time. When the changing angles of light rays exiting specific pixel elements are coordinated with changes in the contents of those light rays (e.g. color and intensity), then this can create images that appear to be three-dimensional.

Micromirror arrays are often used with coherent light, such as the light from lasers, because coherent light can be targeted onto, and bounced off, moving mirrors in a much more precise manner than is possible with incoherent light. In an example, an array of directed coherent light beams bouncing off a micromirror array can be intersected within a volume of translucent material to create changing holographic images.

The limitations of three-dimensional displays using moving micromirror arrays at the pixel-specific level include: (1) they require a large number of Spatial Light Modulators (SLMs), so image size and resolution are limited, at least with current technology; (2) there can be cost and safety issues associated with coherent (eg. laser) light; (3) they require large amounts of data processing, especially for interference fringe patterns; (4) they feature limited color variation; (5) they produce ghost-like images with no opacity and limited interposition; (6) resulting images may have speckle patterns associated with lasers; (7) generally low utilization efficiency of diffracted light for the space modulator when forming interference fringe patterns for real-time hologram animation; (8) mechanical limitations of moving parts; and (9) difficulties of dealing with quantum interactions.

Among the many examples in the prior art that appear to have three-dimensional displays using moving micromirror arrays at the pixel-specific level are U.S. Pat. No. 6,259,450 (Chiabrera et al., 2001), U.S. Pat. No. 6,329,963 (Chiabrera et al., 2001), U.S. Pat. No. 6,956,687 (Moon et al., 2005), U.S. Pat. No. 7,261,417 (Cho et al., 2007), and U.S. Pat. No. 7,505,646 (Katou et al., 2009), and U.S. Patent Application Nos. 20040252187 (Alden, 2004) and 20090040294 (Smalley et al., 2009).

SUMMARY OF THE INVENTION

This invention is a device for displaying images that appear to be three-dimensional with binocular disparity and motion parallax for multiple viewers in different viewing locations. This device includes an array of display elements, wherein at least one of these display elements includes: one or more light-emitting members; and two or more rotating concentric light guides whose rotation guides the directions of the light rays from the light-emitting members. This novel invention corrects many of the limitations of the methods for displaying three-dimensional images in the prior art.

Examples of advantages of this invention over the prior art include the following. As an advantage over prior art that requires glasses or other headgear, this invention does not require any glasses or other headgear. Also, this invention does not require head tracking. Further, this invention can provide three-dimensional images with binocular disparity and motion parallax for multiple viewers in different viewing locations. As an advantage over most volumetric and holographic displays, this invention can create images with full opacity and full occlusion of foreground objects over background objects. As a further advantage over volumetric displays, this invention is less bulky and offers greater potential for touch-based interaction than volumetric displays.

As an advantage over displays with unidirectional linear (eg. vertical or horizontal) parallax barriers or lenticular arrays, this invention offers a full range of motion parallax in any direction. As an advantage over displays with stationary multi-angle sub-pixel display elements, the changing exit angles created by this invention are virtually continuous and limitless (not limited by the number of discrete individual sub-pixels that one can fit into a pixel-size space). This allows much greater image resolution and range of motion parallax than is possible with stationary multi-angle sub-pixel display elements.

Additional advantages of this invention over the prior art include the following. As an advantage over devices with "fly's eye" lens or pin-hole arrays, this invention can capture and display information from the entire surface on an object, not just for certain points. As an advantage over current methods of holographic imaging using rewritable media, the frame rate of this invention is not limited by the refresh rate of photosensitive material. As an advantage over rotating volumetric displays, this invention avoids size and speed constraints due to inertial stress on larger spinning objects. As an advantage over three-dimensional displays with image-wide rotating (or other non-linearly-moving) optical components, this invention allows individual angular control at the level of individual pixels for more precise creation of three-dimensional images. As an advantage over devices with variable focal-length microlenses and micromirror arrays, creating different exit angles by rotational movement allows much more rapid and continuous angle-changing ability than creating different exit angles by inertia-fighting direction-reversing movement. As an additional advantage over many devices using micromirror arrays, this invention does not require coherent light.

Although this invention does not address all of the limitations of methods for three-dimensional display in the prior art, it does address a sufficient number of them to be a significant improvement over the prior art for displaying images that appear to be three-dimensional with binocular disparity and motion parallax.

INTRODUCTION TO THE FIGURES

The following figures show different examples of how this invention may be embodied, but they do not limit the full generalizability of the claims.

Figure 14:
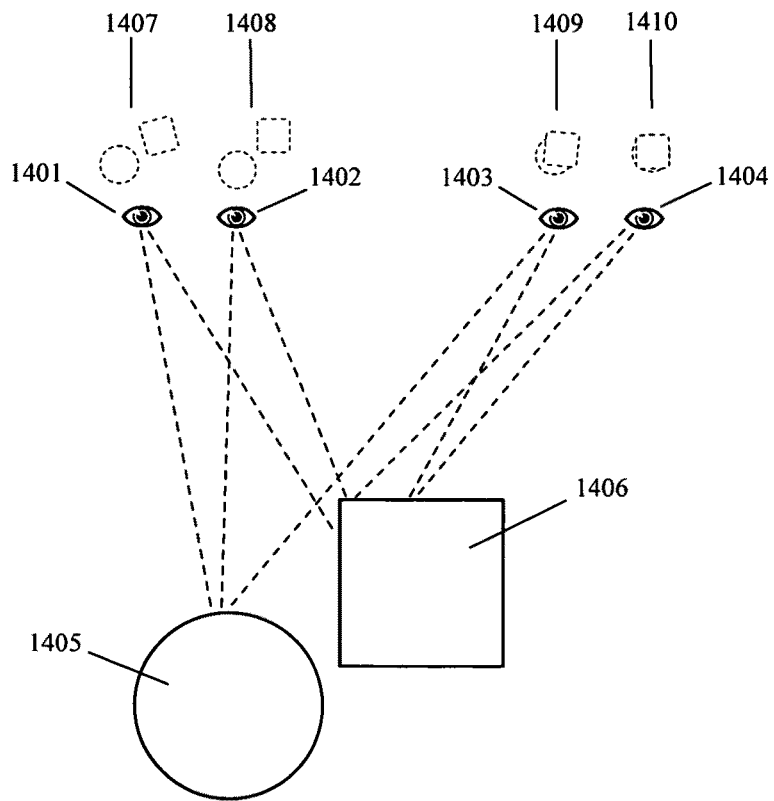
Figure 15:
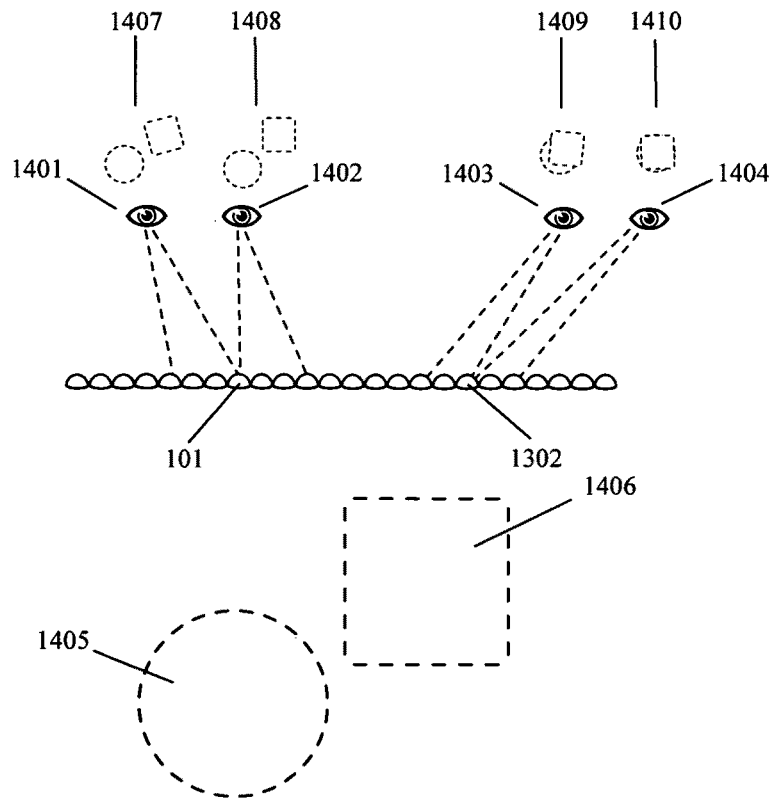

FIGS. 14 and 15 provide a conceptual view of how such an array of display elements can replicate the light beam content and angles that the two viewers would see from real-world objects.

Figure 16:
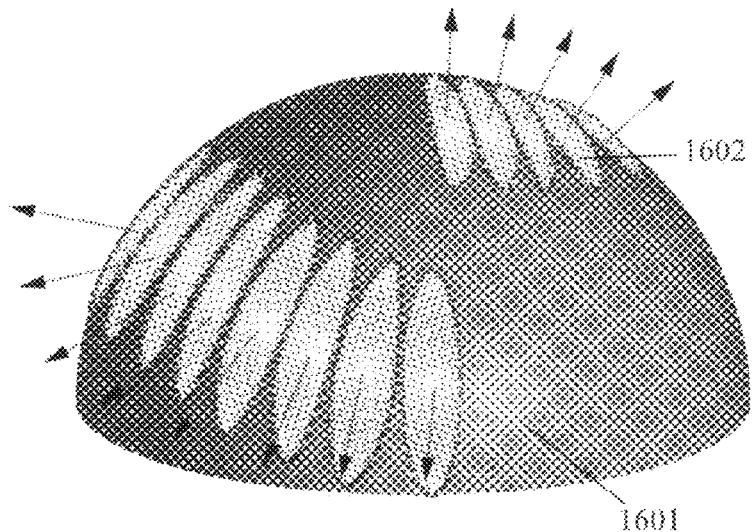
Figure 17:
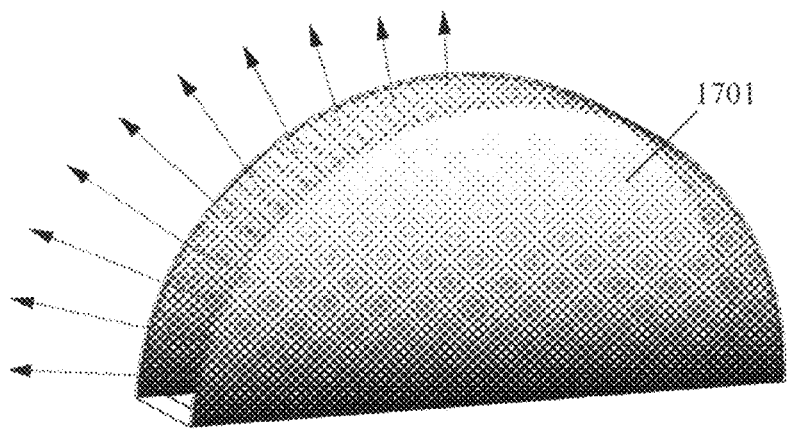
Figure 18:
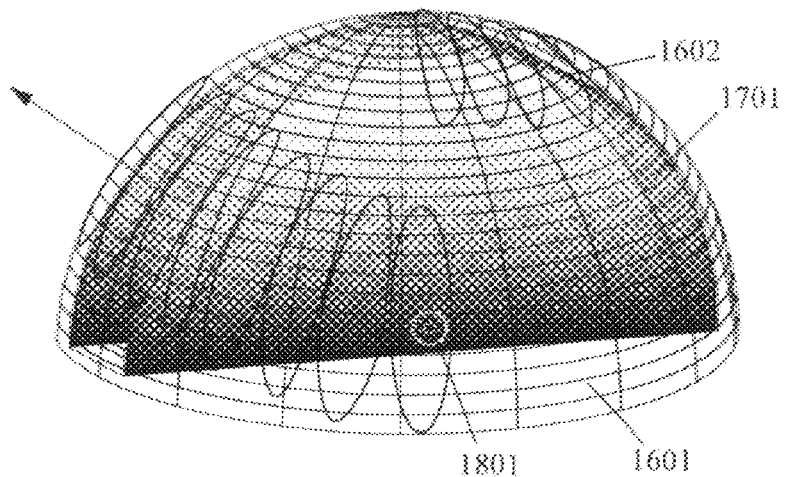

FIGS. 16 through 18 show another example of how two rotating concentric light guides can be part of a display element.

Figure 19:
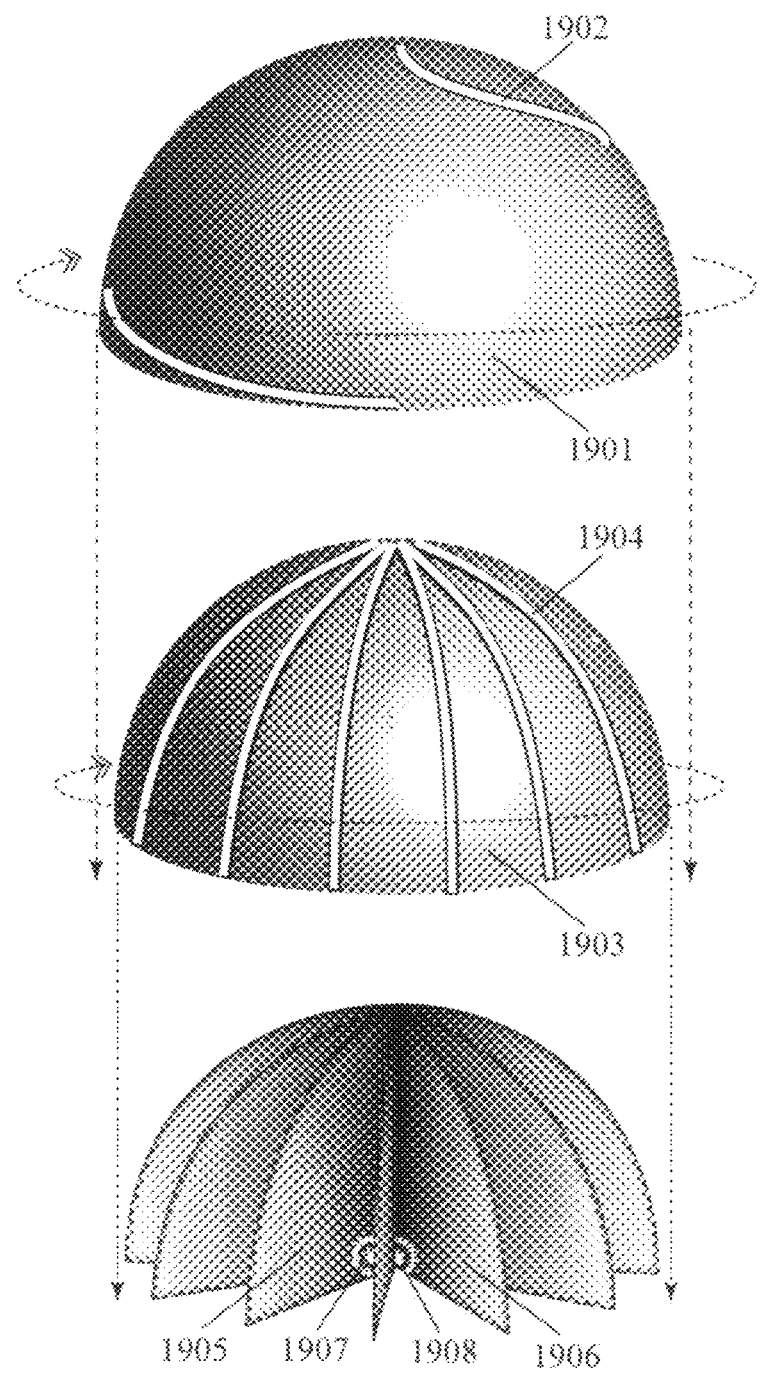
Figure 20:
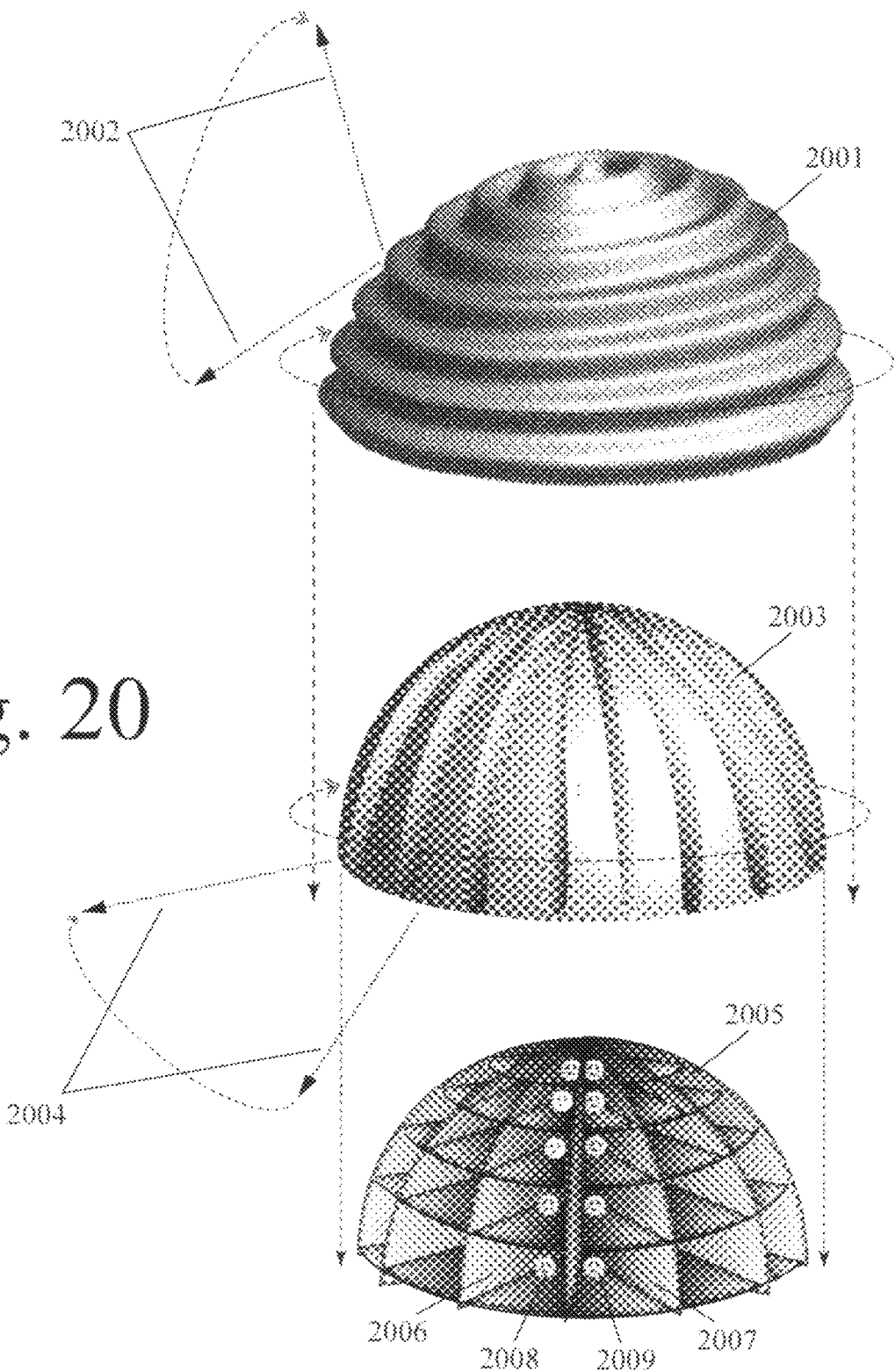

FIGS. 19 and 20 show examples of display elements with multiple light-emitting members.

DETAILED DESCRIPTION OF THE FIGURES

The following figures show different examples of how this invention may be embodied, including examples of different parts of such embodiments. However, these examples are not exhaustive and do not limit the full generalizability of the claims.

FIGS. 1 through 4 show different perspectives of one example of a light guide. This light guide can be part of a display element that, in turn, can be part of an array of display elements which comprise an embodiment of this invention. This array of display elements can display images that appear to be three-dimensional, with binocular disparity and motion parallax, for multiple viewers.

Figure 1:
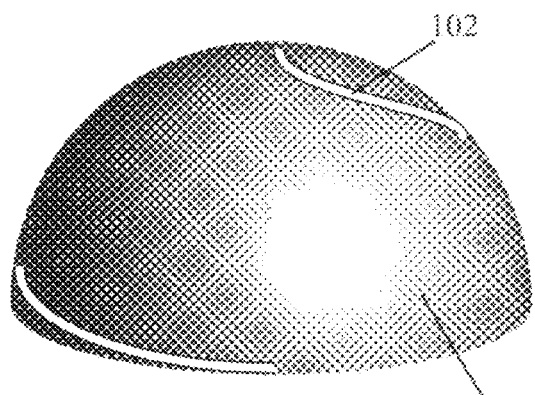
FIGS. 1 through 4 show one example of a first rotating light guide.
Figure 2:
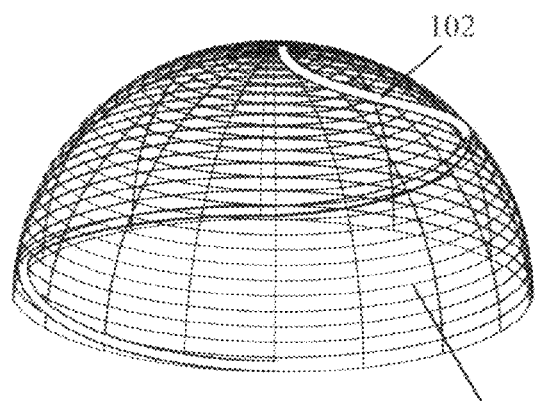
Figure 3:
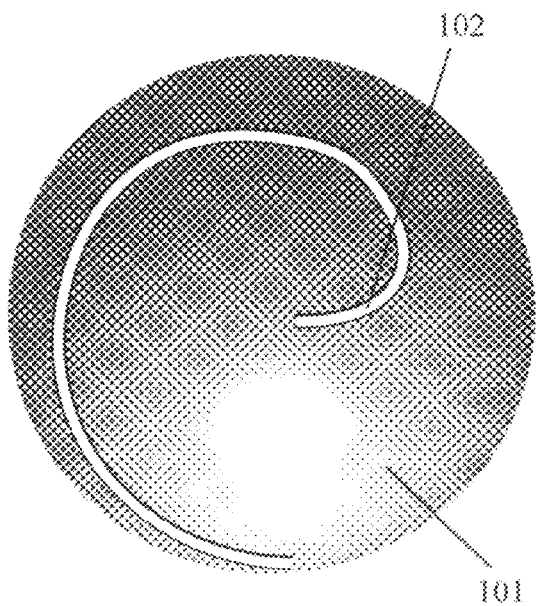
Figure 4:
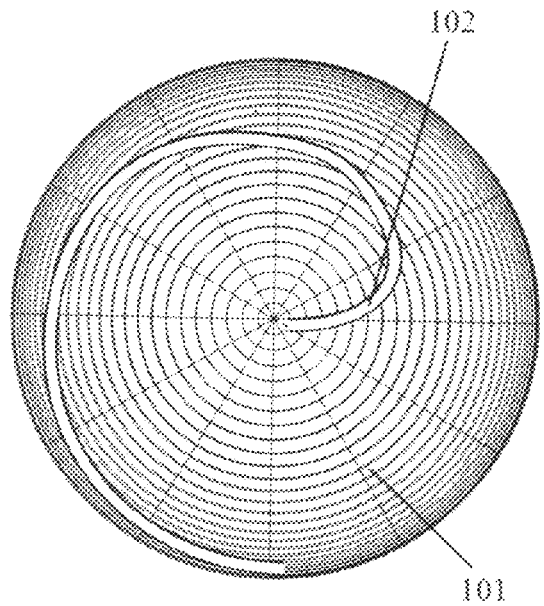

The example light guide shown in FIGS. 1 through 4 is a concave hemispherical member (101) that is opaque except for a spiral opening (102) that spans from the base of the hemisphere to the peak of the hemisphere as it spirals around the perimeter of the hemisphere. FIG. 1 shows this opaque hemispherical light guide from an off-axis side perspective. FIG. 2 shows this light guide from the same perspective, but as if it were a wire-frame structure (instead being opaque as it actually is) in order to provide a better three-dimensional view of the spiral. FIG. 3 shows this opaque hemispherical light guide from a top-down perspective. FIG. 4 shows this light guide from a top-down perspective as if it were a wire-frame structure.

This light guide has a shape that is concave, thereby defining an interior space. A light-emitting member may be located within that interior space. In this example, light from such a light-emitting member inside the light guide would be blocked by the opaque surface of 101 except for the spiral opening 102 through which rays of light may exit. In other examples, the opening through which light rays exit may traverse the surface from base to peak in a diagonal, zig-zag, or step-wise manner. In this example, the light guiding function is performed by a surface that selectively blocks and allows the passage of light. In another example, light rays may be guided by lenses that refract light in a desired direction or by mirrors that reflect light in a desired direction.

In this example, the light guide has a hemispherical shape. In other examples, a light guide may have a shape selected from the group consisting of: sphere; portion of a sphere other than a hemisphere; geodesic sphere, dome, or other three-dimensional structure comprised of polygonal elements; disk or ellipse with concave or convex sides; multi-faceted lens; ascending converging three-dimensional spiral (like a swirl of soft ice cream); multi-faceted lens; and parabolic solid.

In various examples, this light guide may have a size within a range of 1-100 microns. In various examples, this light guide may be rotated at rates within a range of 10-1,000 revolutions per second. In various examples, this light guide may be rotated by one or more means selected from the group consisting of: engagement of the light guide with moving gears; engagement of the light guide with a moving belt; interaction between the material of the light guide and an electromagnetic field causing the guide to spin; and frictional interaction of the light guide with a moving gas or liquid. In various examples, the light guide may be made from materials selected from the group consisting of: metals; polymers (such as polyethylene, polycarbonate, polymethyl methacrylate, polytetrafluoroethylene, polyvinyl butyral, and polyvinyl chloride); and glass.

When a light-emitting member is located within the interior space of this light guide, then rotation of this light guide changes the latitudinal angle of the light rays exiting the light guide at a particular longitude. Latitude in this context may be defined as the angle of a light ray exiting the light guide relative to the plane of the base circumference of the hemisphere. In an example that includes an array of display elements that each contains a light guide, then latitude may be defined as the angle of a light ray relative to the plane of the array of display elements. Longitude in this context may be defined as the rotational angle, or polar coordinate, of a light ray exiting the light guide relative to the rotational axis of the light guide.

Figure 5:
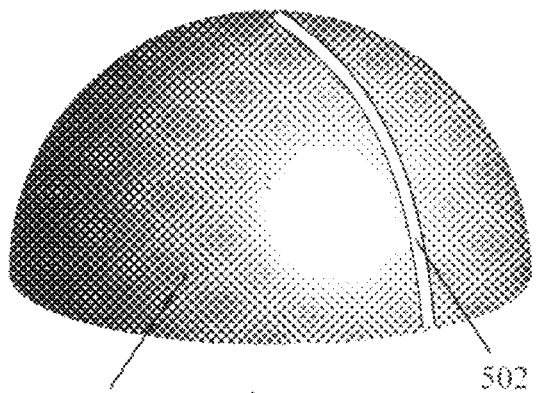
FIGS. 5 through 8 show one example of a second rotating light guide.
Figure 6:
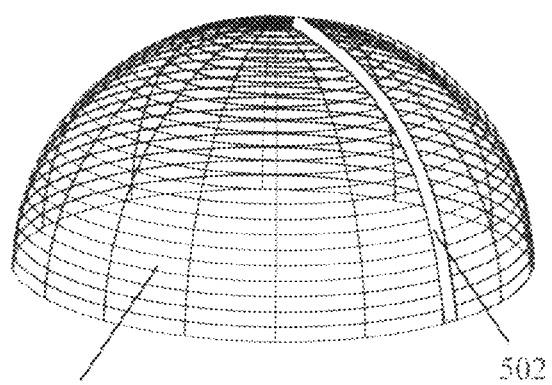
Figure 7:
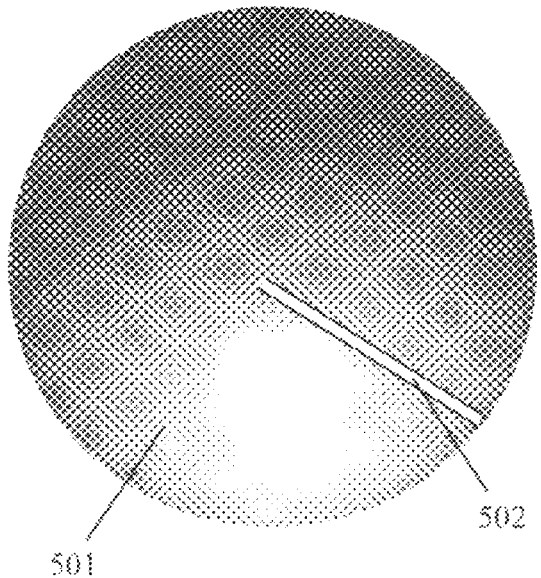
Figure 8:
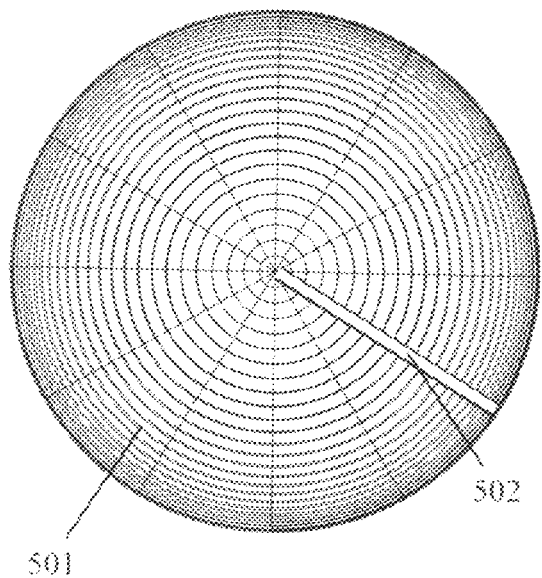

FIGS. 5 through 8 show different images and perspectives of a second example of a light guide. This second light guide is a concave hemispherical light guide (501) with a surface that is opaque except for a curved opening (502) that spans in a direct arc along the surface of the guide from the base of the hemisphere to the peak of the hemisphere. FIG. 5 shows this opaque hemispherical light guide from an off-axis side perspective. FIG. 6 shows this light guide from a side perspective as if it were a wire-frame structure in order to provide a better three-dimensional view. FIG. 7 shows this opaque hemispherical light guide from a top-down perspective. FIG. 8 shows this light guide from a top-down perspective as if it were a wire-frame structure.

This light guide has a shape that is concave, thereby defining an interior space. A light-emitting member may be located within that interior space. In this example, light rays from such a member would be guided by a surface that selectively blocks and allows the passage of light. In other examples, light rays may be guided by a light guide with lenses that refract light or with mirrors that reflect light. In this example, the light guide has a hemispherical shape. In other examples, the light guide may have a shape selected from the group consisting of: sphere or portion of a sphere other than a hemisphere; geodesic sphere, dome, or other three-dimensional structure comprised of polygonal elements; disk or ellipse with concave or convex sides; multi-faceted lens; ascending converging three-dimensional spiral (like a swirl of soft ice cream); multi-faceted lens; and parabolic solid.

In various examples, this light guide may have a size within a range of 1-100 microns. In various example, this light guide may be rotated at rates within a range of 10-1,000 revolutions per second. In various examples, this light guide may be rotated by one or more means selected from the group consisting of: engagement of the light guide with moving gears; engagement of the light guide with a moving belt; interaction between the material of the light guide and an electromagnetic field that causes the guide to spin; and frictional interaction of the light guide with a moving gas or liquid. In various examples, the light guide may be made from materials selected from the group consisting of: metals; polymers (such as polyethylene, polycarbonate, polymethyl methacrylate, polytetrafluoroethylene, polyvinyl butyral, and polyvinyl chloride); and glass.

When a light-emitting member is located within the interior space of this light guide, then rotation of this light guide changes the longitudinal angle of the light rays exiting the light guide, at a particular latitude. Longitude in this context may be defined as the rotational angle, or polar coordinate, of a light ray exiting the light guide relative to the rotational axis of the light guide. Latitude in this context may be defined as the angle of a light ray exiting the light guide relative to the plane of the base circumference of the hemisphere. In an example with an array of display elements that each contains a light guide, then latitude may be defined as the angle of a light ray relative to the plane of the array of display elements.

Figure 9:
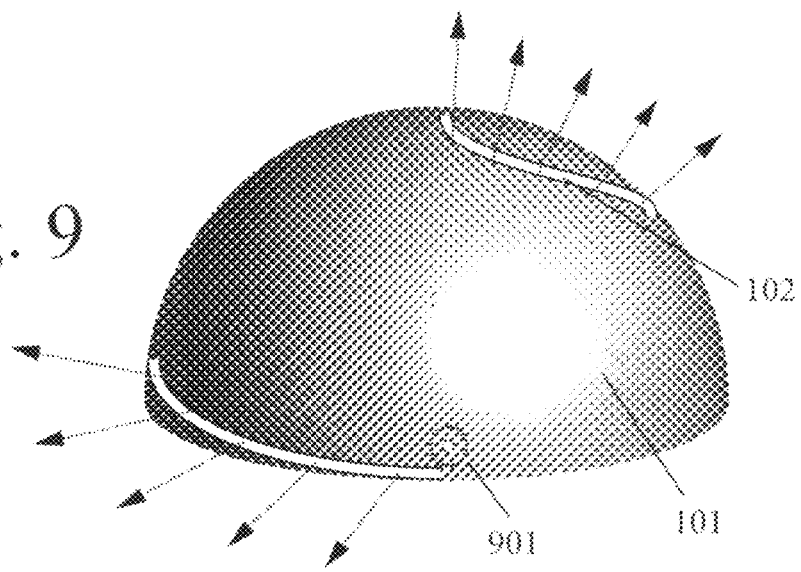
FIGS. 9 through 11 show how these two rotating light guides may be configured in a concentric manner with a light-emitting member inside in order to form a display element, as part of an array of display elements for displaying images that appear to be three-dimensional.
Figure 10:
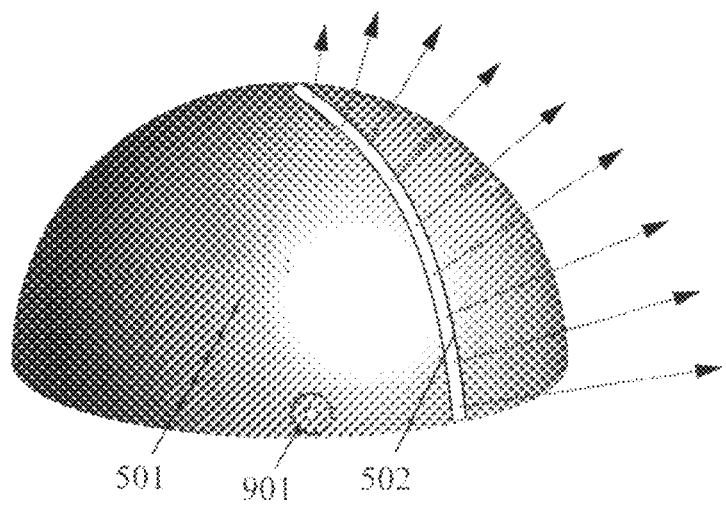
Figure 11:
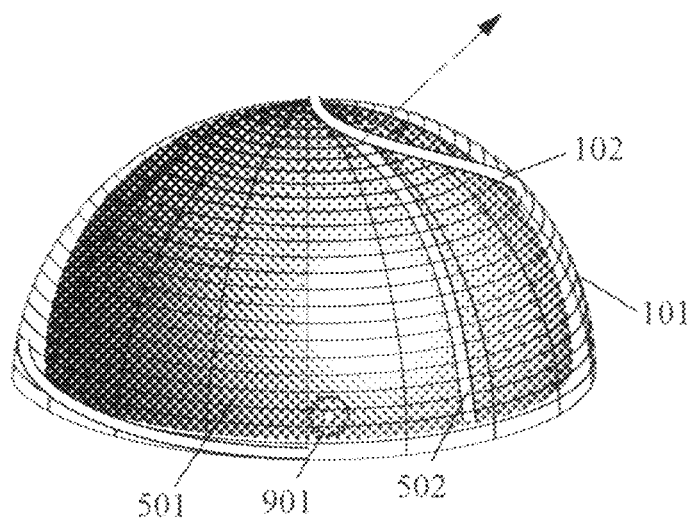

FIGS. 9 through 11 show one example of how two light guides can be configured together in a concentric manner as part of a display element. This display element may serve as a pixel-level light source in an array of display elements for creating three-dimensional images. In this example, the hemispherical light guide with a spiral opening that was shown in FIGS. 1 through 4 is concave, thereby defining an interior space, and the hemispherical light guide with a direct arc opening that was shown in FIGS. 5 through 8 is slightly smaller and located concentrically within that interior space. In another example, the light guide with a spiral opening could be smaller than the light guide with a direct arc opening and their relative concentric positions could be reversed. In this example, the two light guides are not only concentric, but are also coaxial. In another example, the two light guides may be concentric, but not coaxial. In this example, the inner light guide is located entirely within the interior space defined by the concavity of the outer light guide. In another example, the inner light guide may be only partially located within the interior space of the outer light guide.

FIG. 9 shows the opaque hemispherical light guide 101 with spiral opening 102 that was originally shown in FIGS. 1 through 4. FIG. 9 further shows a light-emitting member 901 having been placed within the interior space of this light guide, near the central axis and base of the hemisphere. In various examples, light-emitting member 901 may be selected from the group consisting of: a light source entirely within the display element; and an exit point for light channeled from a light source external to the display element. In various examples, the light-emitting member may be selected from the group consisting of: Light Emitting Diodes (LEDs), lasers, incandescent lights, and fluorescent lights. In FIG. 9, light-emitting member 901 is shown as if it may be seen through the opaque surface of 101 in order that it can be seen in this figure, but in reality it would not be visible through the opaque surface from this perspective. FIG. 9 also shows light rays from the light-emitting member 901 as they exit the light guide through spiral opening 102. These light rays are represented in this figure by stylized dotted arrows. As the light guide rotates, the latitudinal angle of light rays exiting the light guide, at a given longitude, varies up and down in a cyclical manner.

FIG. 10 shows the opaque hemispherical light guide 501 with direct arc opening 502 that was originally shown in FIGS. 5 through 8. FIG. 10 further shows a light-emitting member 901 having been placed within the interior space of this light guide, near the central axis and base of the hemisphere. In FIG. 9, light-emitting member 901 is shown as if it may be seen through the opaque surface of 501 in order that it can be seen in this figure, but in reality it would not be visible through the opaque surface from this perspective. FIG. 10 also shows light rays from the light-emitting member 901 as they exit the light guide through arc opening 502. These light rays are represented in this figure by stylized dotted arrows. As the light guide rotates, the longitudinal angle, or polar coordinate, of light rays exiting the light guide, at a given latitude, varies in a rotational manner.

FIG. 11 shows the two light guides, 101 and 501, in a concentric configuration with light guide 101 on the outside, light guide 501 on the inside, and light-emitting member 901 inside both light guides. When these two light guides and the light-emitting member are combined, they form one possible embodiment of a display element in this invention. With an array of such display elements, one can create images that appear to be three-dimensional with binocular disparity and motion parallax. In FIG. 11, the outer light guide, 101, is shown as a wire frame (instead of being opaque as it actually is) in order to more clearly show the concentric configuration of the two light guides. In another example, the concentric positions of the light guides may be reversed, with light guide 501 on the outside and light guide 101 on the inside.

In FIG. 11, the light guiding functions of the two light guides are combined. Light guide 101 guides exiting light rays in a latitudinal manner. Light guide 501 guides exiting light rays in a longitudinal manner. When light guides 101 and 501 are combined in a concentric configuration, light rays only exit at the latitudinal and longitudinal intersection of the openings of the two guides. By rotating the two light guides at different rates of speed, or in different rotational directions, one can direct exiting light rays to any desired latitudinal and longitudinal angle, or to any desired sequence of angles, in the space surrounding the concentric guides.

Figure 12:
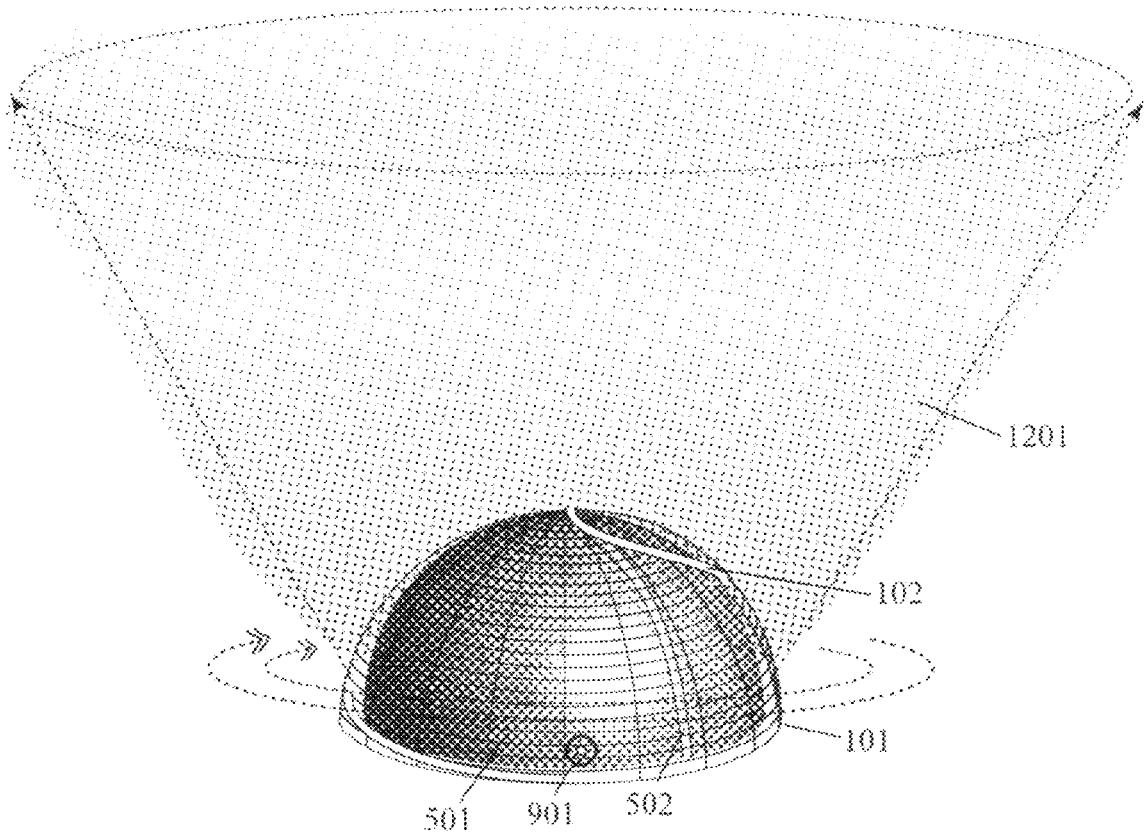
FIG. 12 shows an example of a cone of light rays expanding outwardly from a display element.

By differentially rotating the two light guides, such as in a defined ratio of rotational speeds like those between the minute and seconds hand of a clock, rotation of the two light guides can change the angles of light rays exiting the display element so that these light rays, over time, form a cone (or frustum) of light that expands outwardly from the display element towards viewers. FIG. 12 shows an example of a cone (or frustum) 1201 of light rays expanding outwardly from a display element that is comprised of two concentric light guides, 101 and 501, rotating at different rates, and light-emitting member 901 inside them.

In various examples, the two or more light guides may rotate at rates that differ by one or two orders of magnitude. Greater rotational speeds may offer greater image resolution. The two light guides may rotate in similar, or different, directions selected from the group consisting of: clockwise rotation; counter-clockwise rotation; and oscillating rotation. Changes in the directions of the light rays exiting the display element and changes in the contents of those light rays can be coordinated in order to show different contents from different perspectives. This coordination can create images that appear to be three-dimensional, with binocular disparity and motion parallax, for multiple viewers in different locations, without the need for special eyewear or head tracking. In this example, there are two concentric rotating light guides and one light-emitting member in a display element. In another example, there may be more than two concentric rotating light guides and more than one light-emitting member in a display element.

Figure 13:
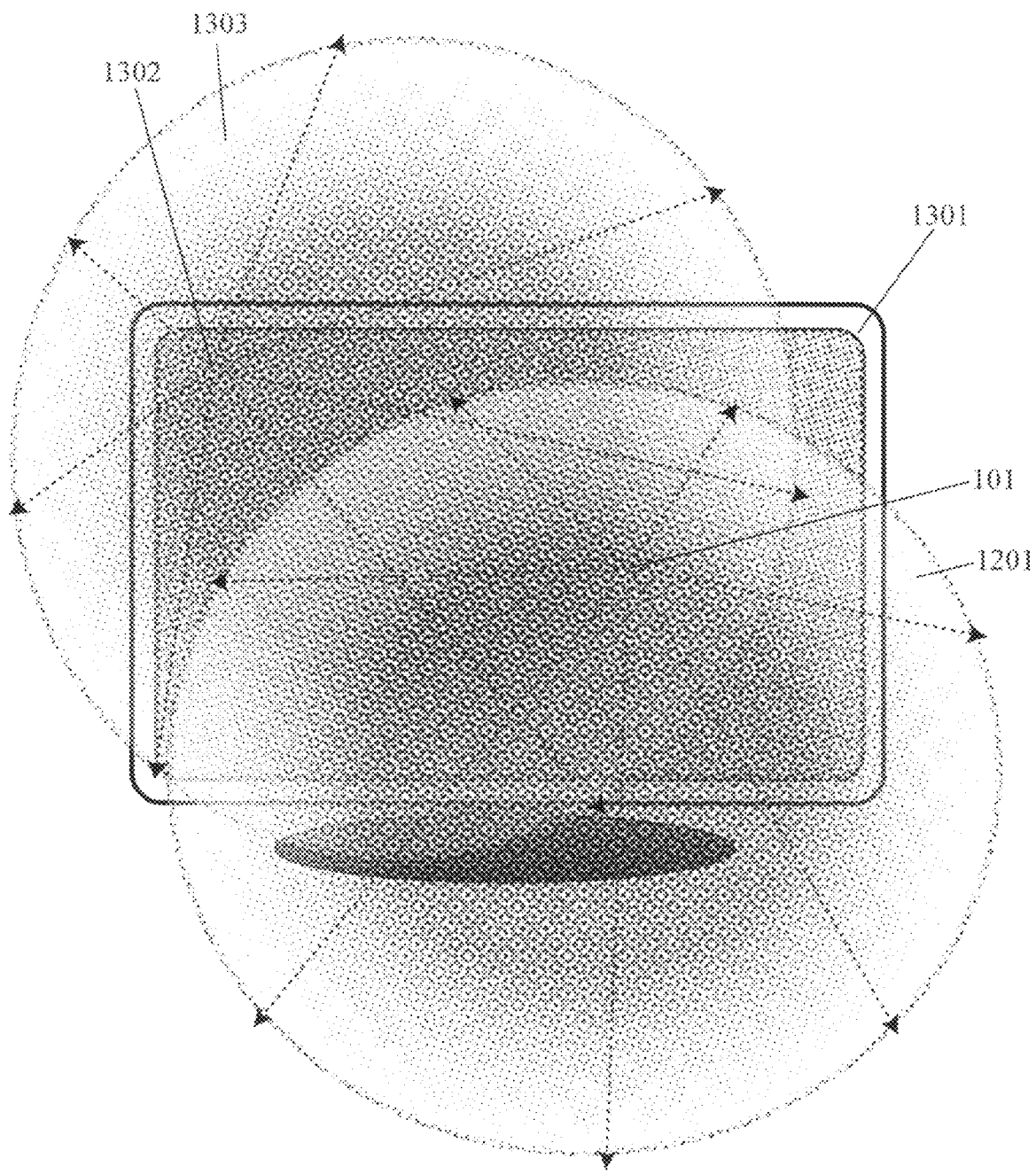
FIG. 13 shows a computer monitor that is comprised of an array of such display elements for displaying images that appear to be three-dimensional.

In this example, the two concentric light guides, 101 and 501, and the light-emitting member 901 combine to form a single display element. In this embodiment of the invention, this display element would be only one of hundreds, or even thousands, of such display elements that comprise an array of display elements to create images that appear to be three-dimensional. FIG. 13 shows an embodiment in which an array of such display elements is configured as a flat computer monitor 1301. FIG. 13 shows two intersecting cones (or frustums) of light, 1201 and 1303, expanding outwardly from two display elements on computer monitor 1301. For the sake of diagrammatic simplicity, only two cones (or frustums) of light from two display elements are shown in this figure. In actuality, there would be hundreds, or even thousands, of intersecting cones (or frustums) of light extending outwardly from the screen, one cone (or frustum) from each of the hundreds, or thousands, of display elements in the array of display elements that comprise the monitor. In this example, the array of display elements is arrayed on a flat surface. In other examples, the array of display elements could be arrayed on a curved surface, such as a cylinder, sphere, parabolic solid, or other curved shape.

Using rotating light guides to change the direction of light rays exiting a display element has advantages over prior art with display elements based on stationary multi-angle sub-pixel display elements. With a display element based on stationary multi-angle sub-pixel display elements, there are limits to how many discrete light sources one can fit into a space the size of a pixel. Also, there are barriers between the discrete sub-pixel light sources. These constraints in the prior art tend to cause a relatively low-resolution expanding cone (or frustum) of light, with choppy movement, and graininess due to the barriers between the sub-pixel light sources. In contrast, using rotating concentric light guides, as claimed in this invention, allows smooth and continuous movement of the light rays as they fill in the cone (or frustum) of light over time. Accordingly, this invention can offer higher-resolution, less-grainy, three-dimensional images than those offered by prior art with stationary multi-angle sub-pixel display elements.

Further, using an array of display elements comprised of rotating concentric light guides has advantages over prior art that uses an array of adjustable micromirrors. One advantage is that rotation of concentric light guides can be done rapidly and smoothly, without the inertia-fighting reversals of direction that are required to continually adjust the angle of a micromirror. Another advantage is that the rotating concentric light guides used in this invention do not require coherent light, but micromirror arrays in the prior art tend to require coherent light for precise reflection of light rays.

FIGS. 14 and 15 provide a conceptual view of how this example of a device for displaying images can replicate the light beam content and angles that two viewers would see from real-world objects. For example, FIG. 14 shows a top-down cross-sectional perspective of the two viewers, represented by eyes 1401, 1402, 1403 and 1404 who are observing spherical object 1405 and cubic object 1406. Approximate representations of the views seen by each of the four eyes 1401, 1402, 1403, and 1404 are shown as dotted-line images 1407, 1408, 1409 and 1410 respectively. For example, eye 1401 sees a gap between spherical object 1405 and cubic object 1406 in dotted-line perspective representation 1407. Eye 1402 also sees such a gap, but from a slightly-different angle, so cubic object 1406 is slightly tilted in dotted-line perspective 1408. The combination of the two different perspectives, 1407 and 1408, from slightly-different angles is called binocular disparity and is an important cue for three-dimensional perception. From the perspective of viewer two, that person's eyes 1403 and 1404 see the spherical 1405 and cubic 1406 objects as overlapping without a gap. These perspectives are shown in dotted-line perspectives 1409 and 1410.

FIG. 15 shows a top-down cross-sectional perspective of the two viewers seeing the light rays emitted from a display screen comprised of an array of display elements as discussed in prior figures. For diagrammatic purposes, a cross-sectional line of only around 25 display elements are shown, but the number of display elements across the width of an actual large-scale display could be in the hundreds or even thousands. The contents and angles of the light rays exiting the display elements are coordinated so that each eye sees the appropriate content from the appropriate angle to create an illusion of the spherical and cubic objects being three-dimensional, with binocular disparity and motion parallax. In FIG. 15, sphere 1405 and cube 1406 are virtual three-dimensional images perceived by the viewers, not actual objects.

FIGS. 16 through 18 show another example of how two or more rotating concentric light guides can form part of a display element. FIG. 16 shows an example of a light guide with a generally-opaque hemispherical surface 1601 with a series of lenses 1602 that spiral around the light guide from a point on its base to its peak in the span of 360 degrees. In an example, the individual lenses may be convex. In this example, these lenses are separated and have elliptical perimeters on the surface of the light guide. In another example, these lenses may have perimeters with shared edges. FIG. 16 shows stylized dotted arrows that represent light rays exiting light guide 101 through the spiraling series of lenses 1602. As the light guide rotates, the latitudinal angle of the light rays exiting at a particular longitude changes. Accordingly, rotation of this light guide allows one to control of the latitude of the light rays exiting the guide, wherein latitude may be defined as the angle of a light ray exiting the light guide relative to the plane of base of the light guide. In an example involving an array of multiple display elements and light guides, then latitude may be defined as the angle of a light ray relative to the plane of the array of display elements.

FIG. 17 shows an example of a light guide with two substantially-parallel semi-circular sides, wherein their straight-line bases are connected by a rectangular plane. In this example, the semi-circular portions of their perimeters are not connected, allowing light rays to exit through this opening. In another example, the semi-circular portions of their perimeters may be connected by a series of light-transmitting or focusing lenses. The size of the opening, or the focal precision of the lenses, is sufficiently narrow that rotation of the light guide allows one to control of the rotational angle, or polar coordinate, of light rays exiting the light guide at a particular latitude. Accordingly, rotation of this light guide allows control over the longitude of light rays exiting the guide, wherein longitude may be defined as the rotational angle or polar coordinate of a light ray exiting the light guide relative to the rotational axis of the light guide.

FIG. 18 shows light guides 1601 and 1701, configured in a concentric manner, with a light-emitting member 1801 inside them. In FIG. 18, light guide 1601 is shown as if it were a wire-frame (instead of being opaque as it actually is, apart from the lenses) in order to show how light guide 1701 fits within it. In FIG. 18, the light-guiding properties of light guides 1601 and 1701 are combined. Light guide 1601 guides the latitudinal angle of exiting light rays and light guide 1701 guides the longitudinal angle of exiting light rays. Together, they control the latitude and longitude of a relatively narrow beam of light rays exiting the display element. When light guides 1601 and 1701 are differentially rotated, changes in the exit angles of this relatively narrow beam of light rays over time will trace out a cone (or frustum) of light in a manner similar to that shown for previous examples of concentric light guides in FIGS. 12 and 13.

FIG. 19 shows another example of two or more rotating concentric light guides that can form part of a display element. This example differs from previous examples in that there are multiple light-emitting members, each in a non-overlapping compartment within the core of the display element. The design of the light guides is modified to properly guide light from multiple light-emitting members instead of just one light-emitting member. Having multiple light-emitting members within a single display element can have advantages including: creation of a complete cone (or frustum) of light rays at lower rotation speeds than is required with a single light-emitting member; and brighter image and more efficient energy use due to a higher proportion of light transmitting surface for at least one light guide.

FIG. 19 shows an example of a first light guide, with a generally-opaque hemispherical surface 1901 and an opening 1902 that spirals around the light guide from a point on its base to its peak in the span of 360 degrees. As this light guide rotates, the latitudinal angle of the light rays at a particular longitude changes. Rotation of this light guide allows control of the latitude of the light rays exiting the guide, wherein latitude may be defined as the angle of a light ray exiting the light guide relative to the plane of base of the light guide.

FIG. 19 also shows an example of a second light guide with a generally-opaque hemispherical surface 1903 and a series of arc openings, including arc opening 1904, from hemisphere base to peak, that are spaced relatively evenly on longitude lines around the hemisphere. Rotation of this light guide allows control over the longitude of light rays exiting the guide, wherein longitude may be defined as the rotational angle or polar coordinate of a light ray exiting the light guide relative to the rotational axis of the light guide.

FIG. 19 also shows an example of how multiple light-emitting members, including light-emitting members 1907 and 1908, can be configured within separate compartments in the core of the display element (inside the two concentric rotating light guides). In this example, the light-emitting members, including 1907 and 1908, are contained in separate compartments formed by quarter-circle fins, including fins 1905 and 1906, that extend out in a radial manner and are evenly-spaced in terms of polar coordinates from a central axis.

FIG. 19 also shows dashed arrows descending from the first light guide 1901 to the second light guide 1903, and also from the second light guide 1903 to the multi-fin structure that contains light-emitting members 1907 and 1908. These arrows indicate how the display element can be formed by configuring light guides 1901 and 1903 in a concentric manner, with the multi-fin structure containing light-emitting members 1907 and 1908 inside both light guides. In this example of a display element with multiple light-emitting members, multiple arc openings such as 1904 simultaneously control the longitudes of light rays exiting multiple light-emitting members at a given point in time, while spiral opening 1902 controls the latitudes of light rays exiting multiple light-emitting members. By dividing up the cone (or frustum) of light that is required for creating three-dimensional images into segments, with one light-emitting member per segment, the rotational speeds need not as high, images can be brighter, and the display element can be more energy efficient.

FIG. 20 shows another example of a display element with concentric rotating light guides and multiple light-emitting members. In this example, there are multiple light-emitting members in different latitudinal compartments within each longitudinal section of the core of the display element, allowing a larger number of light-emitting members than was possible in the example shown in FIG. 19. In this example, the designs of both light guides have been modified to guide light from multiple light-emitting members.

FIG. 20 shows an example of a first light guide 2001 with an ascending spiral-curvature lens that takes several turns to go from the base of the light guide to its peak. The ascending spiral lens allows simultaneous guidance of the latitudinal angles of light rays from multiple light-emitting elements within each longitudinal section. The changing latitudinal angle of light rays from one light-emitting member as the light guide rotates is indicated by the up-down movement of stylized arrow 2002.

FIG. 20 also shows an example of a second light 2003 with a series of ribbed curvature lenses, each lens following a longitudinal arc from the base of the light guide to its peak. The multiple ribbed lenses allow simultaneous guidance of the longitudinal angles of light rays from multiple light-emitting elements within each latitudinal section. The changing longitudinal angle of light rays from one light-emitting member as the light guide rotates is indicated by the lateral movement of stylized arrow 2004.

FIG. 20 also shows an example of how multiple light-emitting members, including light-emitting members 2008 and 2009, can be configured within separate compartments in the core of the display element inside the concentric rotating light guides. In this example, the light-emitting members, including 2008 and 2009, are contained in separate compartments formed by longitudinally and latitudinally defined fins, including fins 2006 and 2007, that extend outwardly, in a radial manner, from a central axis. In FIG. 20, the core 2005 of this display element is formed by the light-emitting members, including 2008 and 2009, and the fins that define the compartments, including 2006 and 2007.

I claim:

1. A device with an array of display elements that displays images that appear to be three-dimensional, comprising: a first display element that comprises one or more first light-emitting members and two or more rotating concentric first light guides whose rotation guides the directions of the light rays from the one or more first light-emitting members, wherein the first light guides are coaxial, rotating around a first axis; and a second display element that comprises one or more second light-emitting members and two or more rotating concentric second light guides whose rotation guides the directions of the light rays from the one or more second light-emitting members, wherein the second light guides are coaxial, rotating around a second axis, and wherein the second axis is different than the first axis; wherein an outer first light guide has a shape that is fully or partially concave, thereby defining an interior space, and wherein an inner first light guide is located fully or partially within the interior space; wherein at least one of the first light guides has a shape that is fully or partially concave, thereby defining an interior space, and wherein one or more first light-emitting members are located fully or partially within the interior space; and wherein an outer second light guide has a shape that is fully or partially concave, thereby defining an interior space, and wherein an inner second light guide is located fully or partially within the interior space; wherein at least one of the second light guides has a shape that is fully or partially concave, thereby defining an interior space, and wherein one or more second light-emitting members are located fully or partially within the interior space.

2. The device in claim 1 wherein changes in the directions of the light rays exiting a display element and changes in the contents of those light rays are coordinated to show different contents from different viewing perspectives and thereby display images that appear to be three-dimensional, with binocular disparity and motion parallax, for multiple viewers.

3. The device in claim 1 wherein a first light guide guides light by one or more means selected from the group consisting of: holes or transparent portions that allow light to pass through; barriers that block the passage of light; lenses or other optics that refract or channel light; and mirrors or other surfaces that reflect light.

4. The device in claim 1 wherein the two or more first light guides rotate in similar, or different, directions selected from one or more selections in the group consisting of: clockwise rotation; counter-clockwise rotation; and oscillating rotation.

5. The device in claim 1 wherein a first light-emitting member is selected from the group consisting of: a light source within the first display element; and an exit point for light channeled from a light source external to the first display element.

6. The device in claim 1 wherein the array of display elements is arrayed on a surface with a shape selected from one or more selections in the group consisting of: flat surface; and curved surface.

7. The device in claim 1 wherein the first light guides have shapes selected from one or more selections in the group consisting of: sphere, hemisphere, or other portion of a sphere; geodesic sphere, dome, or other three-dimensional structure comprised of polygonal elements; disk or ellipse with concave or convex sides; multi-faceted lens; ascending converging three-dimensional spiral; multi-faceted lens; and parabolic solid.

8. The device in claim 1 wherein the first light guides of a first display element change the latitude and longitude of the angles by which light rays exit that display element, wherein latitude may be defined as the angle of a light ray relative to the plane of the array of display elements, and wherein longitude may be defined as the rotational angle, or polar coordinate, of a light ray relative to the rotational axis of a light guide.

9. The device in claim 1 wherein the two or more first light guides are rotated by one or more means selected from the group consisting of: engagement of the light guides with moving gears; engagement of the light guides with moving belts; interaction between the material of the light guides with an electromagnetic field; and interaction of the light guides with a moving gas or liquid.

10. The device in claim 1 wherein the two or more first light guides rotate at rates that differ by up to two orders of magnitude.

11. The device in claim 1 wherein differential rotation of the first light guides changes the angles of light rays exiting a first display element so that these light rays, over time, form a cone or frustum of light expanding outwardly from the first display element.

12. The device in claim 1 wherein the first light-emitting members are selected from one or more selections in the group consisting of: Light Emitting Diodes (LEDs), lasers, incandescent lights, and fluorescent lights.

13. The device in claim 1 wherein there are multiple first light-emitting members, in separate compartments, in each first display element.

14. The device in claim 1 wherein the size of a first display element is within the range of 1-100 microns.

15. The device in claim 1 wherein an outer first light guide of a first display element changes the latitude of the exit angles by which light rays exit the first display element, wherein an inner first light guide of the first display element changes the longitude of the exit angles by which light rays exit the first display element, wherein latitude may be defined as the angle of a light ray relative to the plane of the array of display elements, and wherein longitude may be defined as the rotational angle or polar coordinate of a light ray relative to the rotational axis of the inner first light guide.

16. The device of claim 1 wherein an inner first light guide of a first display element changes the latitude of the exit angles by which light rays exit the first display element, wherein an outer first light guide of the first display element changes the longitude of the exit angles by which light rays exit the first display element, wherein latitude may be defined as the angle of a light ray relative to the plane of the array of display elements, and wherein longitude may be defined as the rotational angle or polar coordinate of a light ray relative to the rotational axis of the outer first light guide.

17. The device in claim 1 wherein the first light guides in the first display element are coaxial and have a rotational axis that is substantially perpendicular to the plane of the array of display elements.

18. The device in claim 1 wherein the first light guides rotate at a rate within the range of 10-1,000 revolutions per second.

19. The device in claim 1 wherein the first light-guides are made from materials selected from one or more selections in the group consisting of: metals; polymers (such as polyethylene, polycarbonate, polymethyl methacrylate, polytetrafluoroethylene, polyvinyl butyral, and polyvinyl chloride); and glass.

20. A device with an array of display elements that displays images that appear to be three-dimensional, comprising:
  a first display element that comprises one or more first light-emitting members and two or more rotating concentric first light guides whose rotation guides the directions of the light rays from the one or more first light-emitting members;
    wherein the first light guides are coaxial, rotating around a first axis;
    wherein a first light-emitting member is selected from the group consisting of a light source within the first display element and an exit point for light channeled from a light source external to the first display element;
    wherein changes in the directions of the light rays exiting the first display element and changes in the contents of those light rays are coordinated to show different contents from different viewing perspectives and thereby display images that appear to be three-dimensional;
    wherein an outer first light guide has a shape that is fully or partially concave, thereby defining an interior space, and wherein an inner first light guide is located fully or partially within that interior space;
    wherein at least one of the first light guides has a shape that is fully or partially concave, thereby defining an interior space, and wherein one or more first light-emitting members are located fully or partially within that interior space;
    wherein a first light guide guides light by one or more means selected from the group consisting of: holes or transparent portions that allow light to pass through, barriers that block the passage of light, lenses or other optics that refract or channel light, and mirrors or other surfaces that reflect light; and
    wherein the two or more first light guides rotate in similar, or different, directions selected from one or more selections in the group consisting of: clockwise rotation, counter-clockwise rotation, and oscillating rotation; and
  a second display element that comprises one or more second light-emitting members and two or more rotating concentric second light guides whose rotation guides the directions of the light rays from the one or more second light-emitting members;
    wherein the second light guides are coaxial, rotating around a second axis, and wherein the second axis is different than the first axis;
    wherein a second light-emitting member is selected from the group consisting of a light source within the second display element and an exit point for light channeled from a light source external to the second display element;
    wherein changes in the directions of the light rays exiting the second display element and changes in the contents of those light rays are coordinated to show different contents from different viewing perspectives and thereby display images that appear to be three-dimensional;
    wherein an outer second light guide has a shape that is fully or partially concave, thereby defining an interior space, and wherein an inner second light guide is located fully or partially within that interior space;
    wherein at least one of the second light guides has a shape that is fully or partially concave, thereby defining an interior space, and wherein one or more second light-emitting members are located fully or partially within that interior space;
    wherein a second light guide guides light by one or more means selected from the group consisting of: holes or transparent portions that allow light to pass through, barriers that block the passage of light, lenses or other optics that refract or channel light, and mirrors or other surfaces that reflect light; and
    wherein the two or more second light guides rotate in similar, or different, directions selected from one or more selections in the group consisting of: clockwise rotation, counter-clockwise rotation, and oscillating rotation.

21. The device in claim 20 wherein the array of display elements is arrayed on a surface with a shape selected from one or more selections in the group consisting of: a flat surface; and a curved surface.

22. The device in claim 20 wherein the first light guides have shapes selected from one or more selections in the group consisting of: sphere, hemisphere, or other portion of a sphere; geodesic sphere, dome, or other three-dimensional structure comprised of polygonal elements; disk or ellipse with concave or convex sides; multi-faceted lens, converging ascending three-dimensional spiral; multi-faceted lens; and parabolic solid.

23. The device in claim 20 wherein the first light guides of a first display element change the latitude and longitude of the angles by which light rays exit that display element, wherein latitude may be defined as the angle of a light ray relative to the plane of the array of display elements, and wherein longitude may be defined as the rotational angle, or polar coordinate, of a light ray relative to the rotational axis of a light guide.

24. The device in claim 20 wherein the two or more first light guides are rotated by one or more means selected from the group consisting of: engagement of the light guides with moving gears; engagement of the light guides with moving belts; interaction between the material of the light guides with an electromagnetic field; and interaction of the light guides with a moving gas or liquid.

25. The device in claim 20 wherein the two or more first light guides rotate at rates that differ by up to two orders of magnitude.

26. The device in claim 20 wherein differential rotation of the first light guides changes the angles of light rays exiting a first display element so that these light rays, over time, form a cone (or frustum) of light expanding outwardly from the first display element.

27. The device in claim 20 wherein the first light-emitting members are selected from one or more selections in the group consisting of: Light Emitting Diodes (LEDs), lasers, incandescent lights, and fluorescent lights.

28. The device in claim 20 wherein there are multiple first light-emitting members, in separate compartments, in each first display element.

29. The device in claim 20 wherein the size of a first display element is within the range of 1-100 microns.

30. The device in claim 20 wherein an outer first light guide of a first display element changes the latitude of the exit angles by which light rays exit the first display element, wherein an inner first light guide of the first display element changes the longitude of the exit angles by which light rays exit the first display element, wherein latitude may be defined as the angle of a light ray relative to the plane of the array of display elements, and wherein longitude may be defined as the rotational angle or polar coordinate of a light ray relative to the rotational axis of the inner first light guide.

31. The device in claim 20 wherein an outer first light guide of a first display element changes the latitude of the exit angles by which light rays exit the first display element via at least one spiral, diagonal, zig-zag, or step-wise light transmitting, refracting, or reflecting structure that spans from a point on the outer first light guide that is closer to the plane of the array of display elements to a point on the outer first light guide that is farther from the plane of the array of display elements; wherein an inner first light guide of the first display element changes the longitude of the exit angles by which light rays exit the first display element via at least one light transmitting, refracting, or reflecting structure that spans in a relatively straight line or direct arc along the surface of the inner first light guide from a point on the inner first light guide that is closer to the plane of the array of display elements to a point on the inner first light guide that is farther from the plane of the array of display elements.

32. The device in claim 20 wherein the first light guides in the first display element rotate are coaxial and have a rotational axis that is substantially perpendicular to the plane of the array of display elements.

33. The device in claim 20 wherein the first light guides rotate at a rate within the range of 10-1,000 revolutions per second.

34. The device in claim 20 wherein the first light guides are made from materials selected from one or more selections in the group consisting of: metals; polymers (such as polyethylene, polycarbonate, polymethyl methacrylate, polytetrafluoroethylene, polyvinyl butyral, and polyvinyl chloride); and glass.

35. A device with an array of display elements that displays images that appear to be three-dimensional, comprising:
 a first display element that comprises one or more first light-emitting members and two or more rotating concentric first light guides whose rotation guides the directions of the light rays from the one or more first light-emitting members;
  wherein the first light guides are coaxial, rotating around a first axis;
  wherein a first light-emitting member is selected from the group consisting of a light source within the first display element and an exit point for light channeled from a light source external to the display element;
  wherein the array of display elements is arrayed on a surface with a shape selected from one or more selections in the group consisting of: a flat surface; and a curved surface;
  wherein changes in the directions of the light rays exiting the first display element and changes in the contents of those light rays are coordinated to show different contents from different viewing perspectives and thereby display images that appear to be three-dimensional;
  wherein an outer first light guide has a shape that is fully or partially concave, thereby defining an interior space, and wherein an inner first light guide is located fully or partially within that interior space;
  wherein at least one of the first light guides has a shape that is fully or partially concave, thereby defining an interior space, and wherein one or more first light-emitting members are located fully or partially within that interior space;
  wherein a first light guide guides light by one or more means selected from the group consisting of: holes or transparent portions that allow light to pass through, barriers that block the passage of light, lenses or other optics that refract or channel light, and mirrors or other surfaces that reflect light;
  wherein the two or more first light guides rotate in similar, or different, directions selected from one or more selections in the group consisting of: clockwise rotation, counter-clockwise rotation, and oscillating rotation;
  wherein the first light guides have shapes selected from one or more selections in the group consisting of: sphere, hemisphere, or other portion of a sphere; geodesic sphere, dome, or other three-dimensional structure comprised of polygonal elements; disk or ellipse with concave or convex sides; multi-faceted lens, converging ascending three-dimensional spiral; multi-faceted lens; and parabolic solid; and
  wherein the first light guides of a first display element change the latitude and longitude of the angles by which light rays exit that display element, wherein latitude may be defined as the angle of a light ray relative to the plane of the array of display elements, and wherein longitude may be defined as the rotational angle, or polar coordinate, of a light ray relative to the rotational axis of a light guide; and
 a second display element that comprises one or more second light-emitting members and two or more rotating concentric second light guides whose rotation guides the directions of the light rays from the one or more second light-emitting members;
  wherein the second light guides are coaxial, rotating around a second axis, and wherein the second axis is different than the first axis;
  wherein a second light-emitting member is selected from the group consisting of a light source within the second display element and an exit point for light channeled from a light source external to the display element;
  wherein the array of display elements is arrayed on a surface with a shape selected from one or more selections in the group consisting of: a flat surface; and a curved surface;
  wherein changes in the directions of the light rays exiting the second display element and changes in the contents of those light rays are coordinated to show different contents from different viewing perspectives and thereby display images that appear to be three-dimensional;
  wherein an outer second light guide has a shape that is fully or partially concave, thereby defining an interior space, and wherein an inner second light guide is located fully or partially within that interior space;

wherein at least one of the second light guides has a shape that is fully or partially concave, thereby defining an interior space, and wherein one or more second light-emitting members are located fully or partially within that interior space;

wherein a second light guide guides light by one or more means selected from the group consisting of: holes or transparent portions that allow light to pass through, barriers that block the passage of light, lenses or other optics that refract or channel light, and mirrors or other surfaces that reflect light;

wherein the two or more second light guides rotate in similar, or different, directions selected from one or more selections in the group consisting of: clockwise rotation, counter-clockwise rotation, and oscillating rotation;

wherein the second light guides have shapes selected from one or more selections in the group consisting of: sphere, hemisphere, or other portion of a sphere; geodesic sphere, dome, or other three-dimensional structure comprised of polygonal elements; disk or ellipse with concave or convex sides; multi-faceted lens, converging ascending three-dimensional spiral multi-faceted lens; and parabolic solid; and wherein the second light guides of a second display element change the latitude and longitude of the angles by which light rays exit that display element, wherein latitude may be defined as the angle of a light ray relative to the plane of the array of display elements, and wherein longitude may be defined as the rotational angle, or polar coordinate, of a light ray relative to the rotational axis of a light guide.

36. The device in claim 35 wherein the two or more first light guides are rotated by one or more means selected from the group consisting of: engagement of the light guides with moving gears; engagement of the light guides with moving belts; interaction between the material of the light guides with an electromagnetic field; and interaction of the light guides with a moving gas or liquid.

37. The device in claim 35 wherein the two or more first light guides rotate at rates that differ by up to two orders of magnitude.

38. The device in claim 35 wherein differential rotation of the first light guides changes the angles of light rays exiting a display element so that these light rays, over time, form a cone (or frustum) of light expanding outwardly from the first display element.

39. The device in claim 35 wherein the first light-emitting members are selected from one or more selections in the group consisting of: Light Emitting Diodes (LEDs), lasers, incandescent lights, and fluorescent lights.

40. The device in claim 35 wherein there are multiple first light-emitting members, in separate compartments, in each display element.

41. The device in claim 35 wherein the size of a first display element is within the range of 1-100 microns.

42. The device in claim 35 wherein an outer first light guide of a first display element changes the latitude of the exit angles by which light rays exit the first display element, wherein an inner first light guide of the first display element changes the longitude of the exit angles by which light rays exit the first display element, wherein latitude may be defined as the angle of a light ray relative to the plane of the array of display elements, and wherein longitude may be defined as the rotational angle or polar coordinate of a light ray relative to the rotational axis of the inner first light guide.

43. The device in claim 35 wherein an outer first light guide of a first display element changes the latitude of the exit angles by which light rays exit the first display element via at least one spiral, diagonal, zig-zag, or step-wise light transmitting, refracting, or reflecting structure that spans from a point on the outer first light guide that is closer to the plane of the array of display elements to a point on the outer first light guide that is farther from the plane of the array of display elements; wherein an inner first light guide of the first display element changes the longitude of the exit angles by which light rays exit the first display element via at least one light transmitting, refracting, or reflecting structure that spans in a relatively straight line or direct arc along the surface of the inner first light guide from a point on the inner first light guide that is closer to the plane of the array of display elements to a point on the inner first light guide that is farther from the plane of the array of display elements.

44. The device in claim 35 wherein the first light guides in the first display element rotate are coaxial and have a rotational axis that is substantially perpendicular to the plane of the array of display elements.

45. The device in claim 35 wherein the first light guides rotate at a rate within the range of 10-1,000 revolutions per second.

46. The device in claim 35 wherein the first light guides are made from materials selected from one or more selections in the group consisting of: metals; polymers (such as polyethylene, polycarbonate, polymethyl methacrylate, polytetrafluoroethylene, polyvinyl butyral, and polyvinyl chloride); and glass.

47. A method for displaying images that appear to be three-dimensional comprising: changing the directions of first light rays exiting a first display element through the use of two or more rotating concentric first light guides within the first display element; wherein the first light guides are coaxial, rotating around a first axis; changing the directions of second light rays exiting a second display element through the use of two or more rotating concentric second light guides within the second display element; wherein the second light guides are coaxial, rotating around a second axis; wherein the second axis is different than the first axis; and coordinating changes in the directions of the first light rays with changes in the content of the first light rays so that different content is viewed from the first display element from different viewing perspectives in order to create images that appear to be three-dimensional; and coordinating changes in the directions of the second light rays with changes in the content of the second light rays so that different content is viewed from the second display element from different viewing perspectives in order to create images that appear to be three-dimensional; wherein an outer first light guide has a shape that is fully or partially concave, thereby defining an interior space, and wherein an inner first light guide is located fully or partially within the interior space; wherein at least one of the first light guides has a shape that is fully or partially concave, thereby defining an interior space, and wherein one or more first light-emitting members are located fully or partially within the interior space; and wherein an outer second light guide has a shape that is fully or partially concave, thereby defining an interior space, and wherein an inner second light guide is located fully or partially within the interior space; wherein at least one of the second light guides has a shape that is fully or partially concave, thereby defining an interior space, and wherein one or more second light-emitting members are located fully or partially within the interior space.

* * * * *